US012812633B2

(12) United States Patent
Um et al.

(10) Patent No.: US 12,812,633 B2
(45) Date of Patent: Nov. 24, 2026

(54) SCHEDULING METHOD AND APPARATUS IN WIRELESS COMMUNICATION SYSTEM

(71) Applicant: ELECTRONICS AND TELECOMMUNICATIONS RESEARCH INSTITUTE, Daejeon (KR)

(72) Inventors: Jung Sun Um, Daejeon (KR); Sung Ik Park, Daejeon (KR); Hoi Yoon Jung, Daejeon (KR); Nam Ho Hur, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 413 days.

(21) Appl. No.: 18/350,458

(22) Filed: Jul. 11, 2023

(65) Prior Publication Data

US 2024/0023094 A1 Jan. 18, 2024

(30) Foreign Application Priority Data

Jul. 12, 2022 (KR) ........................ 10-2022-0085600
Nov. 4, 2022 (KR) ........................ 10-2022-0146146
Jun. 27, 2023 (KR) ........................ 10-2023-0082425

(51) Int. Cl.
*H04W 72/1268* (2023.01)
*H04W 72/20* (2023.01)

(52) U.S. Cl.
CPC ....... *H04W 72/1268* (2013.01); *H04W 72/20* (2023.01)

(58) Field of Classification Search
CPC ..... H04L 5/001; H04L 5/0035; H04L 5/0053; H04W 72/1268; H04W 72/20
See application file for complete search history.

(56) References Cited

U.S. PATENT DOCUMENTS 9,907,062 B2 2/2018 McBeath et al.
9,986,557 B2 5/2018 Moon et al.
10,555,329 B2 2/2020 Golitschek Edler Von Elbwart et al.
11,418,293 B2 8/2022 Shi et al.
11,456,782 B2 * 9/2022 Kwak ................. H04B 7/0639
(Continued)

FOREIGN PATENT DOCUMENTS

WO 2022010132 A1 1/2022

OTHER PUBLICATIONS

3GPP TS 38.212 V17.1.0 (Mar. 2022); 3rd Generation Partnership Project; Technical Specification Group Radio Access Network; NR; Multiplexing and channel coding (Release 17).

*Primary Examiner* — Zhensheng Zhang
(74) *Attorney, Agent, or Firm* — Rabin & Berdo, P.C.

(57) ABSTRACT

A method of a base station may comprise: transmitting, to a terminal, a higher layer message including a first table mapping between cell groups and indicators each indicating the cell groups; transmitting, to the terminal, multi-cell scheduling control information; transmitting, to the terminal, data through multiple cells based on the higher layer message and the multi-cell scheduling control information; and receiving, from the terminal, a response message for the data transmitted through the multiple cells based on the multi-cell scheduling control information, wherein the multi-cell scheduling control information includes first information indicating one cell group at least among the cell groups and uplink resource allocation information.

15 Claims, 13 Drawing Sheets

(56) References Cited

U.S. PATENT DOCUMENTS

| | | | |
|---|---|---|---|
| 2012/0039180 A1 | 2/2012 | Kim et al. | |
| 2020/0128520 A1 | 4/2020 | Chen et al. | |
| 2021/0314994 A1 | 10/2021 | Ang et al. | |
| 2021/0410119 A1 | 12/2021 | Takeda et al. | |
| 2022/0255700 A1* | 8/2022 | Jang | H04L 5/0044 |
| 2022/0408464 A1* | 12/2022 | MolavianJazi | H04W 72/0453 |

* cited by examiner

SCHEDULING METHOD AND APPARATUS IN WIRELESS COMMUNICATION SYSTEM

CROSS-REFERENCE TO RELATED APPLICATIONS

This application claims priority to Korean Patent Applications No. 10-2022-0085600, filed on Jul. 12, 2022, No. 10-2022-0146146, filed on Nov. 4, 2022, and No. 10-2023-0082425, filed on Jun. 27, 2023, with the Korean Intellectual Property Office (KIPO), the entire contents of which are hereby incorporated by reference.

BACKGROUND

1. Technical Field

Exemplary embodiments of the present disclosure relate to a scheduling technique for a mobile communication system, and more specifically, to a scheduling technique for one or more carriers or cells.

2. Related Art

With the development of information and communication technology, various wireless communication technologies are being developed. Representative wireless communication technologies include long-term evolution (LTE) and new radio (NR) defined as the 3rd generation partnership project (3GPP) standards. The LTE may be one of the 4th generation (4G) wireless communication technologies, and the NR may be one of the 5th generation (5G) wireless communication technologies.

For the processing of rapidly increasing wireless data after commercialization of the 4G communication system (e.g., communication system supporting LTE), the 5G communication system (e.g., communication system supporting NR) using a frequency band (e.g., frequency band above 6 GHz) higher than a frequency band (e.g., frequency band below 6 GHz) of the 4G communication system as well as the frequency band of the 4G communication system is being considered. The 5G communication system can support enhanced Mobile BroadBand (eMBB), Ultra-Reliable and Low-Latency Communication (URLLC), and massive machine type communication (mMTC) scenarios.

The 5G communication system may provide a wireless communication service on a carrier or cell basis. Here, carriers or cells may be identified by different frequency bands, different frequencies within the same band, geographical locations, cell indexes/cell IDs, and/or the like managed by a base station. The base station may configure and manage one or more carriers or cells. A terminal may receive configuration information from the base station and communicate with the base station based on the received configuration information. The configuration information may include information on one or more carriers or cells to be used for communication between the base station and the terminal.

The terminal may use downlink resources (e.g., physical downlink shared channel (PDSCH)) and/or uplink resources (e.g., physical uplink shared channel (PUSCH)) to receive or transmit data. Information on a resource for the terminal to receive or transmit data may be included in downlink control information (DCI) transmitted through a physical downlink control channel (PDCCH) transmitted by the base station. The terminal may monitor the PDCCH, identify the DCI by performing blind-decoding (BD) on the PDCCH, and acquire information on a downlink and/or uplink resource.

When a plurality of carriers or cells are configured, scheduling information may deliver control information limited to each carrier or cell to the terminal. Scheduling may be classified into self-scheduling and cross-scheduling. The self-scheduling may be defined as scheduling for a carrier or cell which control information is transmitted. The cross-scheduling may be defined as scheduling for a designated carrier or cell other than a carrier through which control information is transmitted. The terminal may identify self-scheduling and/or cross-scheduling information according to condition(s) indicated/configured by the base station.

When there are a plurality of carriers or cells configured in the terminal (e.g., up to 8 different carriers or cells) and the cross-scheduling operation is performed, the terminal that needs to receive control information for cross-scheduling should monitor a large number of PDCCHs. In addition, the terminal should perform BD on the respective PDCCHs. Accordingly, the complexity of terminal may increase. In addition, the overhead of control information may increase.

Therefore, a multi-cell scheduling method for scheduling one or more carriers or cells in a wireless communication system is required. In addition, methods for responding whether data (or transport block (TB)) of the respective carriers or cells transmitted through multi-cell scheduling are received normally or abnormally (i.e., reception error) are required.

SUMMARY

Exemplary embodiments of the present disclosure are directed to providing a method and an apparatus for configuring control information for scheduling and managing resources of one or more carriers or cells at once.

According to a first exemplary embodiment of the present disclosure, a method of a base station may comprise: transmitting, to a terminal, a higher layer message including a first table mapping between cell groups and indicators each indicating the cell groups; transmitting, to the terminal, multi-cell scheduling control information; transmitting, to the terminal, data through multiple cells based on the higher layer message and the multi-cell scheduling control information; and receiving, from the terminal, a response message for the data transmitted through the multiple cells based on the multi-cell scheduling control information, wherein the multi-cell scheduling control information includes first information indicating one cell group at least among the cell groups and uplink resource allocation information.

Each of the indicators within the first table may further include second information indicating whether an additional second offset is applied in addition to a first offset between transmission of the multi-cell scheduling control information and transmission of the data.

The higher layer message may further include a second table indicating an additional second offset for each cell included in a cell group to which the second information is applied.

When a number of cells included in the cell group to which the second information is applied is three or more, the additional second offset may be two or more values.

The multi-cell scheduling control information may further include third information indicating a third offset between the transmission of the data and transmission of the response message, and an uplink resource indicated by the uplink resource allocation information may be indicated by the third information from a slot of a cell through which the data is transmitted last among the multiple cells.

The multi-cell scheduling control information may be transmitted in one cell among a predetermined one reference cell among cells included in the cell group indicated by the first information, a cell with a lowest index within the first table among the cells included in the cell group indicated by the first information, or a cell with a highest index within the first table among the cells included in the cell group indicated by the first information.

The response message may be generated by concatenating sub-codebooks respectively generated for cells included in the cell group indicated by the first information.

The sub-codebooks may be concatenated according to an ascending order or descending order of cell indexes within the first table for the cells included in the cell group indicated by the first information.

According to a second exemplary embodiment of the present disclosure, a method of a terminal may comprise: receiving, from a base station, a higher layer message including a first table mapping between cell groups and indicators each indicating the cell groups; receiving, from the base station, multi-cell scheduling control information; receiving, from the base station, data through multiple cells based on the higher layer message and the multi-cell scheduling control information; and transmitting, to the base station, a response message for the data received through the multiple cells based on the multi-cell scheduling control information, wherein the multi-cell scheduling control information includes first information indicating one cell group at least among the cell groups and uplink resource allocation information.

Each of the indicators within the first table may further include second information indicating whether an additional second offset is applied in addition to a first offset between transmission of the multi-cell scheduling control information and transmission of the data.

The higher layer message may further include a second table indicating an additional second offset for each cell included in a cell group to which the second information is applied.

When a number of cells included in the cell group to which the second information is applied is three or more, the additional second offset may have two or more values.

The multi-cell scheduling control information may further include third information indicating a third offset between the transmission of the data and transmission of the response message, and an uplink resource indicated by the uplink resource allocation information may be indicated by the third information from a slot of a cell through which the data is received last among the multiple cells.

The multi-cell scheduling control information may be transmitted in one cell among a predetermined one reference cell among cells included in the cell group indicated by the first information, a cell with a lowest index within the first table among the cells included in the cell group indicated by the first information, or a cell with a highest index within the first table among the cells included in the cell group indicated by the first information.

The response message may be generated by concatenating sub-codebooks respectively generated for cells included in the cell group indicated by the first information.

The sub-codebooks may be concatenated according to an ascending order or descending order of cell indexes within the first table for the cells included in the cell group indicated by the first information.

According to a third exemplary embodiment of the present disclosure, a method of a terminal may comprise: receiving, from a base station, cell configuration information and multi-cell scheduling control information including scheduling information corresponding to the cell configuration information; receiving, from the base station, data based on the multi-cell scheduling control information; and transmitting a response message for the data to the base station, wherein the cell configuration information indicates one of a cell group, a cell subgroup, or one cell.

The cell group may include all of cells schedulable for the terminal, and the cell subgroup may include two or more cells among the cells schedulable for the terminal.

The cell configuration information may be preconfigured in the terminal through a higher layer message.

When the multi-cell scheduling control information indicates the cell group or the cell subgroup, and transmission timings of the data may be different in cells belonging to the cell group or cell subgroup, the response message may be transmitted based on a last transmission timing among the transmitting timings.

According to the present disclosure, the base station may configure single control information to perform scheduling for a plurality of cells at once. In addition, by utilizing single control information, it is made possible to minimize signal processing attempts that the terminal should monitor to identify control information of a plurality of cells. In addition, according to the present disclosure, even when multi-cell scheduling control information is lost in the terminal, the base station and the terminal can identify which PDSCH, data, or TB a reception error of control information corresponding to has occurred through a method of configuring a reception state (e.g., HARQ-ACK) message.

DETAILED DESCRIPTION OF THE EMBODIMENTS

Figure 1:
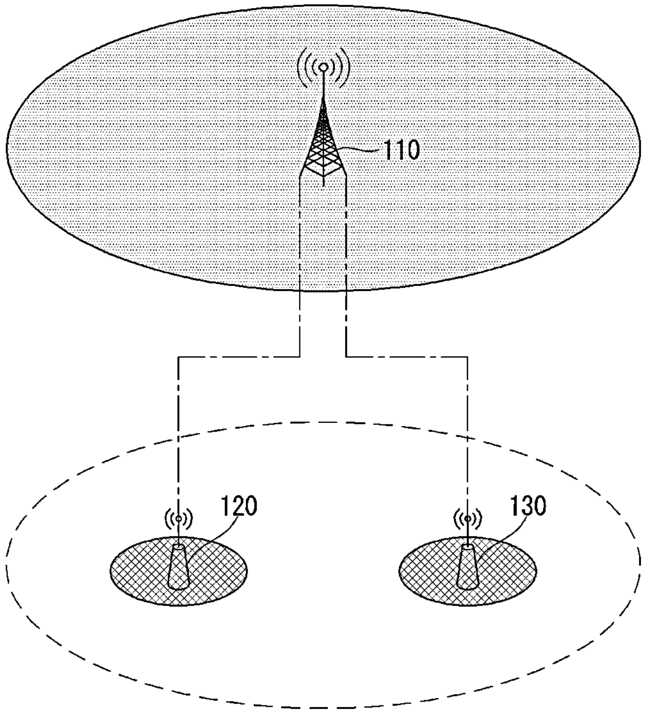
FIG. 1 is a conceptual diagram illustrating a first exemplary embodiment of a wireless communication network.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a wireless communication network.

Referring to FIG. 1, a first base station 110 may support cellular communication (e.g., long term evolution (LTE), LTE-Advanced (LTE-A), LTE-A Pro, LTE-unlicensed (LTE-U), new radio (NR), NR-unlicensed (NR-U), and/or the like). The first base station 110 may support multiple input multiple output (MIMO) (e.g., single user (SU)-MIMO, multi-user (MU)-MIMO, massive MIMO, etc.), coordinated multipoint (CoMP), carrier aggregation (CA), and the like.

The first base station 110 may operate at a frequency F1 and form a macro cell. The first base station 110 may be connected to other base stations (e.g., second base station 120 and third base station 130) through idle backhaul or non-idle backhaul. The second base station 120 may be located within a coverage of the first base station 110. The second base station 120 may operate at a frequency F2 and form a small cell. The second base station 120 may support a different communication scheme (e.g., NR) from the first base station 110.

The third base station 130 may be located within the coverage of the first base station 110. The third base station 130 may operate at the frequency F2 and form a small cell. The third base station 120 may support a different communication scheme (e.g., NR) from the first base station 110. A terminal connected to the first base station 110 may transmit/receive signals/channels with the first base station 110 through CA between the frequencies F1 and F2. A terminal supporting dual connectivity (DC) may be connected to the first base station 110 and the second base station 120, transmit and receive signals/channels with the first base station 110 using the frequency F1, and transmit/receive signals/channels with the second base station 120 using the frequency F2.

The communication node (i.e., base station, terminal, etc.) constituting the wireless communication network described above may support a communication protocol based on code division multiple access (CDMA), a communication protocol based on wideband CDMA (WCDMA), a communication protocol based on time division multiple access (TDMA), a communication protocol based on frequency division multiple access (FDMA), a communication protocol based on single carrier (SC)-FDMA, a communication protocol based on orthogonal frequency division multiplexing (OFDM), a communication protocol based on orthogonal frequency division multiple access (OFDMA), and/or the like.

Among the communication nodes, the base station may be referred to as NodeB, evolved NodeB (eNB), 5g NodeB (gNB), base transceiver station (BTS), radio base station, radio transceiver, access point, access node, transmission/reception point (Tx/Rx Point), or the like. Among the communication nodes, the terminal may be referred to as user equipment (UE), access terminal, mobile terminal, station, subscriber station, portable subscriber station, mobile station, node, device, or the like.

The communication node may have the following structure.

Figure 2:
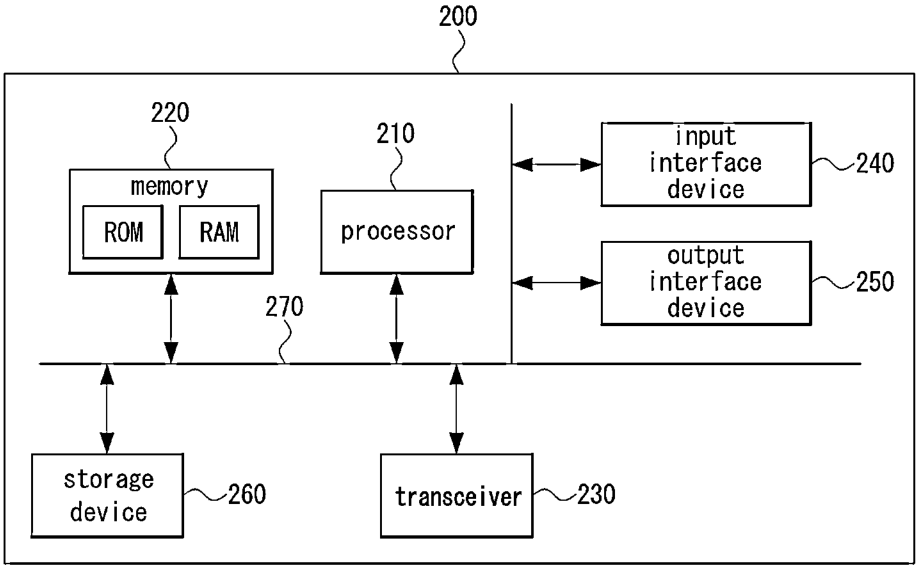
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, operation methods of communication nodes in a wireless communication network will be described. Even when a method (e.g., transmission or reception of a signal) performed at a first communication node among communication nodes is described, the corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of a base station is described, a corresponding terminal may perform an operation corresponding to the operation of the base station.

Figure 3:
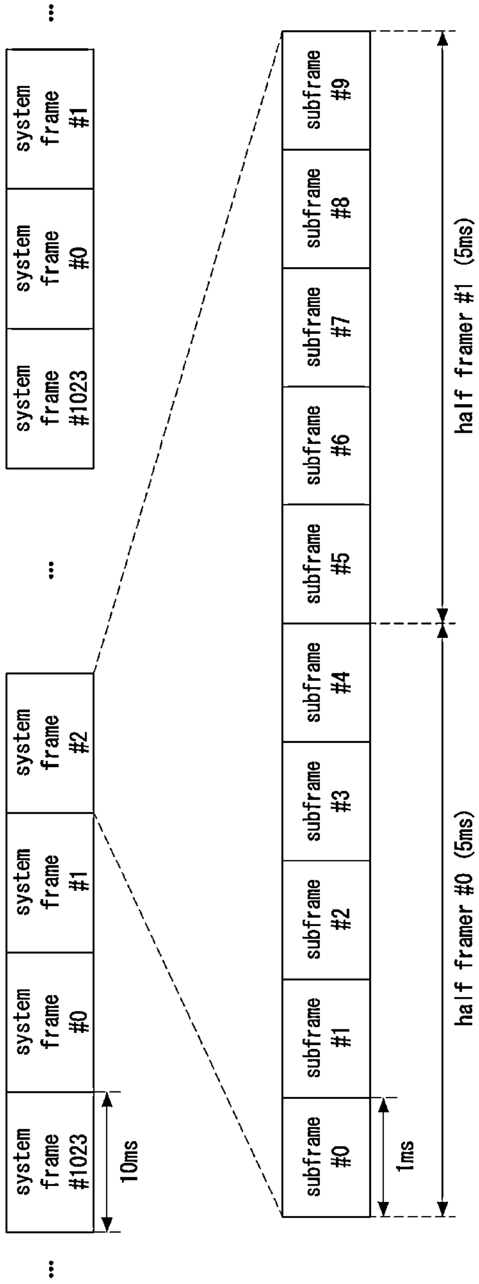
FIG. 3 is a conceptual diagram illustrating a first exemplary embodiment of a system frame in a wireless communication network.

FIG. 3 is a conceptual diagram illustrating a first exemplary embodiment of a system frame in a wireless communication network.

Referring to FIG. 3, time resources in the wireless communication network may be divided on a frame basis. For example, system frames of the wireless communication network may be configured continuously in the time domain. The length of the system frame may be 10 millisecond (ms). A system frame number (SFN) may be set to one of #0 to #1023. In this case, 1024 system frames may be repeated on the time axis of the wireless communication network. For example, an SFN of a system frame after the system frame #1023 may be #0.

One system frame may include two half frames. The length of one half frame may be 5 ms. A half frame located at a starting region of the system frame may be referred to as 'half frame #0', and a half frame located at an ending region of the system frame may be referred to as 'half frame #1'. One system frame may include 10 subframes. The length of one subframe may be 1 ms. 10 subframes within one system frame may be referred to as subframes #0-#9.

Figure 4:
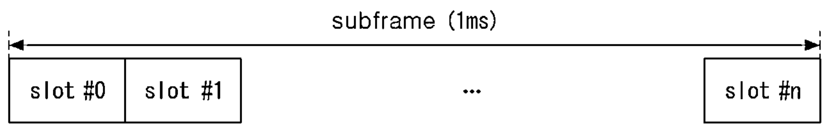
FIG. 4 is a conceptual diagram illustrating a first exemplary embodiment of a subframe in a wireless communication network.

FIG. 4 is a conceptual diagram illustrating a first exemplary embodiment of a subframe in a wireless communication network.

Referring to FIG. 4, one subframe may include n slots, and n may be a natural number. Accordingly, one subframe may consist of one or more slots.

Figure 5:
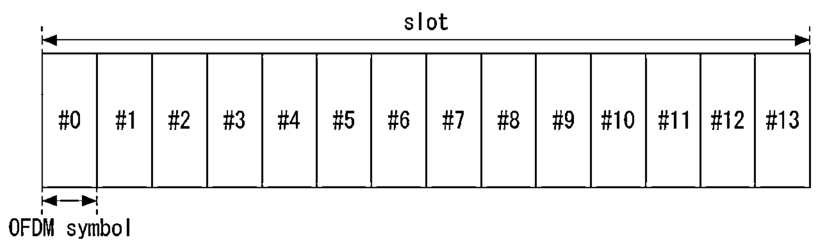
FIG. 5 is a conceptual diagram illustrating a first exemplary embodiment of a slot in a wireless communication network.
Figure 6:
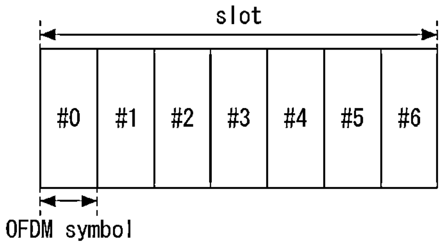
FIG. 6 is a conceptual diagram illustrating a second exemplary embodiment of a slot in a wireless communication network.

FIG. 5 is a conceptual diagram illustrating a first exemplary embodiment of a slot in a wireless communication network, and FIG. 6 is a conceptual diagram illustrating a second exemplary embodiment of a slot in a wireless communication network.

Referring to FIGS. 5 and 6, one slot may include one or more symbols. One slot shown in FIG. 5 may include 14 symbols. One slot shown in FIG. 6 may include 7 symbols. The length of slot may vary according to the number of symbols included in a slot and the length of symbol. Alternatively, the length of slot may vary according to a numerology. When a subcarrier spacing is 15 kHz (e.g., $\mu=0$), the length of slot may be 1 ms. In this case, one system frame may include 10 slots. When a subcarrier spacing is 30 kHz (e.g., $\mu=1$), the length of slot may be 0.5 ms. In this case, one system frame may include 20 slots.

When a subcarrier spacing is 60 kHz (e.g., $\mu=2$), the length of slot may be 0.25 ms. In this case, one system frame may include 40 slots. When a subcarrier spacing is 120 kHz (e.g., $\mu=3$), the length of slot may be 0.125 ms. In this case, one system frame may include 80 slots. When a subcarrier spacing is 240 kHz (e.g., $\mu=4$), the length of slot may be 0.0625 ms. In this case, one system frame may include 160 slots.

The symbol may be configured as a downlink (DL) symbol, flexible (FL) symbol, or uplink (UL) symbol. A slot composed of only DL symbols may be referred to as a 'DL slot', a slot composed of only FL symbols may be referred to as a 'FL slot', and a slot composed of only UL symbols may be referred to as a 'UL slot'.

Figure 7:
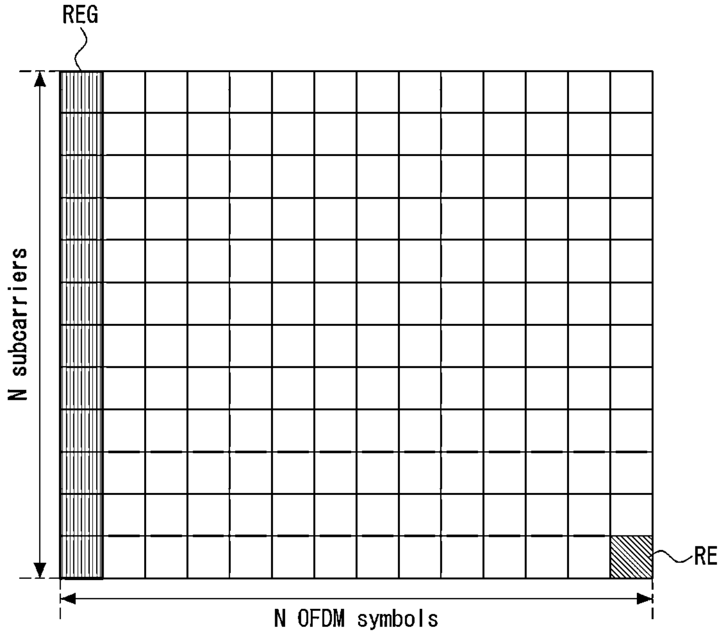
FIG. 7 is a conceptual diagram illustrating a first exemplary embodiment of a time-frequency resource in a wireless communication network.

FIG. 7 is a conceptual diagram illustrating a first exemplary embodiment of a time-frequency resource in a wireless communication network.

Referring to FIG. 7, a resource composed of one OFDM symbol on the time axis and one subcarrier on the frequency axis may be defined as a 'resource element (RE)'. A resource composed of one OFDM symbol on the time axis and K subcarriers on the frequency axis may be defined as a 'resource element group (REG)'. The REG may include K REs. The REG may be used as a basic unit of resource allocation in the frequency domain. K may be a natural number. For example, K may be 12. N may be a natural number. In the slot shown in FIG. 5, N may be 14, and in the slot shown in FIG. 6, N may be 7. N OFDM symbols may be used as a basic unit of resource allocation in the time domain.

Hereinafter, methods for transmitting and receiving data in a wireless communication network will be described. In downlink communication, downlink data may be transmitted through a PDSCH. In uplink communication, uplink data may be transmitted through a PUSCH. In the following exemplary embodiments, a PDSCH may mean downlink data. The base station may transmit downlink control information (DCI) including configuration information of a PDSCH through a PDCCH. In the following exemplary embodiments, a PDCCH may refer to DCI (e.g., control information). The terminal may receive the DCI through the PDCCH and may identify the configuration information of the PDSCH included in the DCI. For example, the configuration information of the PDSCH may include information indicating a PDSCH region in the time domain, information indicating the PDSCH region in the frequency domain, and/or a modulation and coding scheme (MCS) applied thereto.

Figure 8:
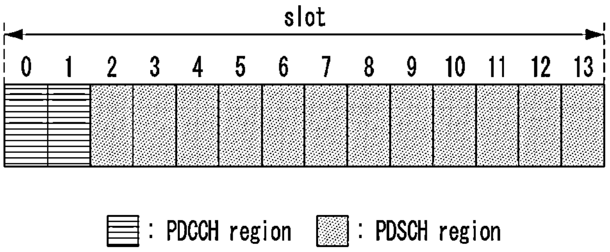
FIG. 8 is a conceptual diagram illustrating a first exemplary embodiment of downlink channels configured within a slot in a wireless communication network.

FIG. 8 is a conceptual diagram illustrating a first exemplary embodiment of downlink channels configured within a slot in a wireless communication network.

Referring to FIG. 8, one slot may include 14 OFDM symbols in the time domain. Among the 14 OFDM symbols, some symbol(s) may be configured as a PDCCH region, and the remaining symbols may be configured as a PDSCH region. For example, OFDM symbols #0-#1 may be configured as a PDCCH region, and OFDM symbols #2-#13 may be configured as a PDSCH region.

The PDCCH region may be configured from a start of the slot, and the PDSCH region may be configured after the PDCCH region within the slot. This mapping type may be referred to as 'PDSCH mapping type A'. When the PDSCH mapping type A is used, a position of a demodulation reference signal (DMRS) in the time domain may be defined based on the first OFDM symbol (e.g., OFDM symbol #0) of the slot. For example, if a symbol offset of the DMRS is 2, the DMRS may be located in the OFDM symbol #2 within the slot.

Figure 9:
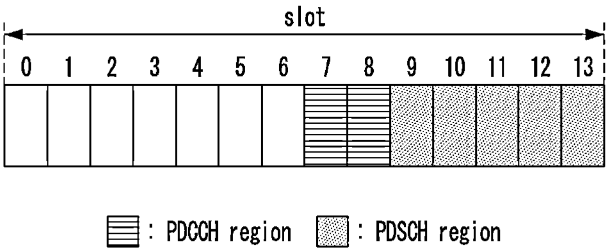
FIG. 9 is a conceptual diagram illustrating a second exemplary embodiment of downlink channels configured within a slot in a wireless communication network.

FIG. 9 is a conceptual diagram illustrating a second exemplary embodiment of downlink channels configured within a slot in a wireless communication network.

Referring to FIG. 9, one slot may include 14 OFDM symbols in the time domain. A PDCCH region may be configured in any OFDM symbol(s) within the slot, and a PDSCH region may be configured after the PDCCH region within the slot. For example, OFDM symbols #7-#8 may be configured as a PDCCH region, and OFDM symbols #9-#13 may be configured as a PDSCH region. This mapping type may be referred to as 'PDSCH mapping type B'. When the PDSCH mapping type B is used, a position of a DMRS in the time domain may be defined based on the first OFDM symbol (e.g., OFDM symbol #9) in which a PDSCH is configured. For example, if a symbol offset of the DMRS is 2, the DMRS may be located in the OFDM symbol #11 within the slot.

Hereinafter, PDCCH monitoring methods will be described. The terminal may perform a PDCCH monitoring operation to receive DCI including scheduling information of a PDSCH. Configuration information for PDCCH monitoring may be transmitted from the base station to the terminal through a higher layer message (e.g., radio resource control (RRC) message). The configuration information for PDCCH monitoring may be included in control resource set (CORESET) information and/or search space information.

The CORESET information may include one or more of the following parameters.

- controlResourceSetId (e.g., CORESET ID)
- frequencyDomainResources (e.g., frequency resource information of CORESET)
- duration (e.g., time resource information of CORESET (e.g., search space))
- cce-REG-mappingType (e.g., interleaving information of PDCCH)
- precoderGranularity (e.g., precoding information of PDCCH)
- tci-StatesPDCCH
- tci-PresentInDCI
- pdcch-DMRS-ScramblingID (e.g., information on a DMRS for PDCCH demodulation)

The frequency resource information of CORESET (e.g., information on a frequency resource in which PDCCHs may exist) may be configured in units of n RBs. n may be a natural number. For example, n may be 6. The time resource information of CORESET (e.g., information on a time resource in which PDCCHs may exist) may be configured in units of m OFDM symbols. m may be a natural number. For example, m may be 1, 2, or 3.

The search space information may include one or more of the following parameters.

- searchSpaceId (e.g., search space ID)
- controlResourceSetId (e.g., ID of a CORESET associated with the search space)
- monitoringSlotPeriodicityAndOffset (e.g., periodicity and offset of PDCCH monitoring slot(s), the periodicity and offset of PDCCH monitoring slot(s) may be configured in units of slots)
- duration (e.g., the number of consecutive slots on which PDCCH monitoring is performed)
- monitoringSymbolsWithinSlot (e.g., the first symbol(s) in which PDCCH monitoring is performed within a slot, the corresponding symbol(s) may be indicated in a bitmap form)
- nrofCandidates (e.g., the number of PDCCH candidates per aggregation level)

searchSpaceType (e.g., common search space (CSS), UE-specific search space (USS), DCI formats to be monitored)

The terminal may receive the CORESET information and the search space information from the base station, identify PDCCH monitoring occasion(s) based on the CORESET information and search space information, and perform a monitoring operation on the PDCCH monitoring occasion(s). The PDCCH monitoring occasion may be configured as follows.

Figure 10:
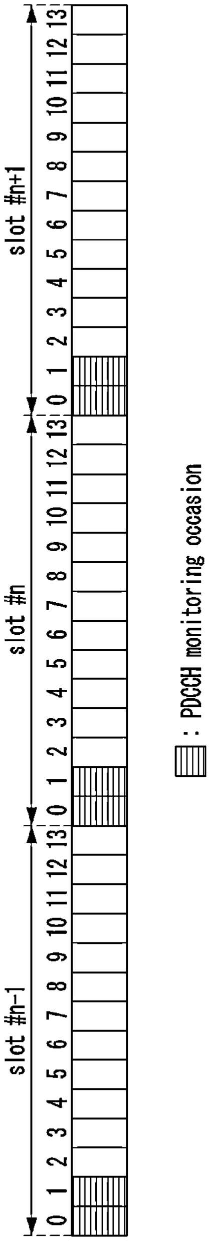
FIG. 10 is a conceptual diagram illustrating a first exemplary embodiment of a PDCCH monitoring occasion in a wireless communication network.

FIG. 10 is a conceptual diagram illustrating a first exemplary embodiment of a PDCCH monitoring occasion in a wireless communication network.

Referring to FIG. 10, the length of the PDCCH monitoring occasion in the time domain may be indicated by the CORESET information (e.g., duration). The length of the PDCCH monitoring occasion may be indicated in units of symbols. For example, the length of the PDCCH monitoring occasion may be 2 symbols. In each of the slots, symbols #0-#1 may be configured as the PDCCH monitoring occasion, and a periodicity of a PDCCH monitoring occasion slot may be one slot. In this case, an offset of the PDCCH monitoring occasion slot may be 0.

The terminal may identify the PDCCH monitoring occasion using the search space information and the CORESET information associated with the corresponding search space information (e.g., CORESET information mapped to a CORESET ID included in the search space information). For example, the terminal may identify a starting symbol (e.g., symbol #0) of the PDCCH monitoring occasion within a slot based on monitoringSlotPeriodicityAndOffset and monitoringSymbolsWithinSlot included in the search space information, and may identify the length (e.g., 2 symbols) of the PDCCH monitoring occasion based on duration included in the associated CORESET information. The terminal may perform a monitoring operation (e.g., blind decoding operation) on the identified PDCCH monitoring occasion.

Figure 11:
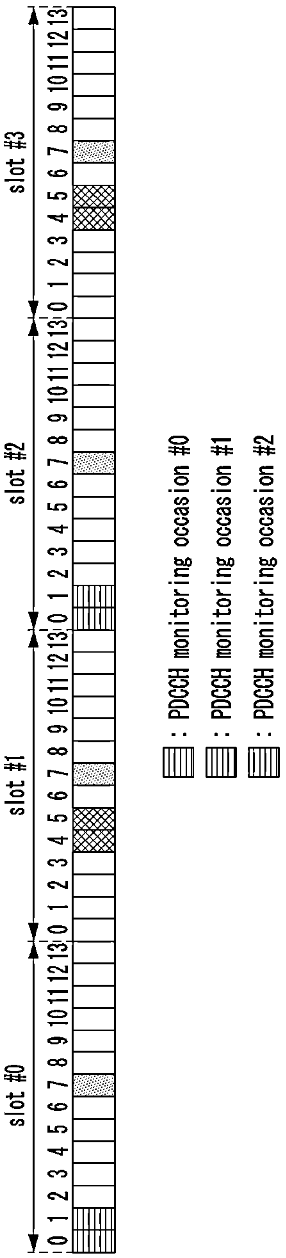
FIG. 11 is a conceptual diagram illustrating a second exemplary embodiment of a PDCCH monitoring occasion in a wireless communication network.

FIG. 11 is a conceptual diagram illustrating a second exemplary embodiment of a PDCCH monitoring occasion in a wireless communication network.

Referring to FIG. 11, a plurality of CORESETs (e.g., CORESETs #0-#1) and a plurality of search spaces (e.g., search spaces #0-#3) may be configured. The base station may transmit information on the CORESET #0 and information on the CORESET #1 to the terminal, and may transmit information on the search space #0, information on the search space #1, and information on the search space #2 to the terminal. The terminal may receive the information on the CORESETs #0-#1 and the information on the search spaces #0-#2 from the base station, and may identify the PDCCH monitoring occasions based on the information on the CORESETs #0-#1 and the information on the search spaces #0-#2.

The search space #0 may be associated with the CORESET #0. Based on the information on the search space #0 and the information on the CORESET #0, the length of a PDCCH monitoring occasion #0 in the time domain may be one symbol, a starting symbol of the PDCCH monitoring occasion #0 may be the symbol #7, a periodicity for the PDCCH monitoring occasion #0 may be one slot, and an offset for the PDCCH monitoring occasion #0 may be 0. Accordingly, the terminal may perform a monitoring operation (e.g., blind decoding operation) on the PDCCH monitoring occasion #0 configured in the symbol #7 of each slot. The terminal may detect DCI by performing the monitoring operation on the PDCCH monitoring occasion #0, and may acquire a PDSCH based on information included in the DCI.

The search space #1 may be associated with the CORESET #1. Based on the information on the search space #1 and the information on the CORESET #1, the length of a PDCCH monitoring occasion #1 in the time domain may be two symbols, a starting symbol of the PDCCH monitoring occasion #1 may be the symbol #0, a periodicity for the PDCCH monitoring occasion #1 may be two slots, and an offset for the PDCCH monitoring occasion #1 may be 0. Accordingly, the terminal may perform a monitoring operation (e.g., blind decoding operation) on the PDCCH monitoring occasion #1 configured in the symbols #0-#1 of the slots #0 and #2. The terminal may detect DCI by performing the monitoring operation on the PDCCH monitoring occasion #1, and may acquire a PDSCH based on information included in the DCI.

The search space #2 may be associated with the CORESET #1. Based on the information on the search space #2 and the information on the CORESET #1, the length of a PDCCH monitoring occasion #2 in the time domain may be two symbols, a starting symbol of the PDCCH monitoring occasion #2 may be the symbol #4, a periodicity for the PDCCH monitoring occasion #2 may be two slots, and an offset for the PDCCH monitoring occasion #2 may be 1. Accordingly, the terminal may perform a monitoring operation (e.g., blind decoding operation) on the PDCCH monitoring occasion #2 configured in the symbols #4-#5 of the slots #1 and #3. The terminal may detect DCI by performing the monitoring operation on the PDCCH monitoring occasion #2, and may acquire a PDSCH based on information included in the DCI.

1. Multi-Cell Scheduling Control Information (DCI)

Hereinafter, 'multi-cell scheduling control information' defined in the present disclosure will be described.

One DCI may schedule PDSCH(s) and/or PUSCH(s) for one carrier or cell. In the present disclosure described below, a method for one DCI to schedule PDSCH(s) and/or PUSCH(s) in one or more carriers or cells will be described. In the present disclosure, 'multi-cell scheduling control information' may be defined as control information for scheduling PDSCH(s) and/or PUSCH(s) in one or more carriers or cells. A cell through which multi-cell scheduling control information is transmitted may be defined as a 'multi-cell control information scheduling cell'.

The multi-cell scheduling control information may be scheduling information for a plurality of cells. In other words, the multi-cell scheduling control information may be scheduling information for the respective downlinks of a plurality of cells or scheduling information for the respective uplinks of a plurality of cells. In the following description, 'multi-cell scheduling control information' may be expressed and described only as 'control information' or expressed and described as DCI.

1.1 Bit Length of Multi-Sell Scheduling Control Information (DCI)

Information fields included in DCI may be determined according to an operation condition of each cell or a condition configured by the base station for each terminal operating in each cell. For example, the bit length (or size, etc.) of DCI may vary depending on a cell operation condition and/or a terminal operation condition. Each of the terminals may perform detection (e.g., blind detection (BD)) on valid DCIs in consideration of candidate bit lengths of DCI configured and transmitted by the base station.

1.1.1 Number of Candidate Bit Lengths of Multi-Cell Scheduling Control Information (DCI)

When each terminal perform DCI detection, the number of different DCI bit lengths to be considered may be limited to A for each carrier and/or each cell. In an exemplary embodiment, A may be 4. One DCI bit length among A DCI bit lengths may have a fixed bit length determined according to a configured operation condition (e.g., bandwidth, number of RBs) of each carrier or cell. Accordingly, one DCI bit length among the A DCI bit lengths may be determined in advance. The remaining DCI bit lengths (i.e., (A−1) DCI bit length(s)) other than the one determined bit length may be determined according to an operation condition configured by the base station for each of the terminals. Each of the terminals may identify information on the remaining bit lengths through a higher layer message or RRC configuration/reconfiguration message of the base station. Bit lengths may not be the same between different carriers and/or cells.

The bit length of multi-cell scheduling control information may also be determined according to a DCI configuration scheme. For example, in the multi-cell scheduling control information, the number of different carriers and/or cells configurable by control information for scheduling uplink PUSCH(s) and the number of different carriers and/or cells configurable by control information for scheduling downlink PDSCH(s) may be defined differently from each other. The number of configurable carriers and/or cells in uplink and downlink may be configured differently for each user. In other words, the bit length of multi-cell scheduling control information for scheduling of multi-cell PDSCH(s) and the bit length of multi-cell scheduling control information for scheduling of multi-cell PUSCH(s) may be different from each other, and also may be different for each user. If the bit length of multi-cell scheduling control information is different from bit lengths of DCI for other purposes, the bit length of multi-cell scheduling control information may be counted as one of the A bit lengths.

1.1.2 Determination of Bit Length of Multi-Cell Scheduling Control Information (DCI)

Hereinafter, an exemplary embodiment of a method of defining a bit length of multi-cell scheduling control information and a method of defining the number of different bit lengths per cell will be described.

Since the number of different bit lengths is limited to A, configuration of fields in multi-cell scheduling control information or configuration of bit sizes of the fields may be required in consideration of the bit lengths of DCI for other purposes. In addition, it may be required to adjust a bit length determined according to basically configured fields and the bit lengths of the respective fields in order to satisfy the restriction according to A bit lengths.

Hereinafter, conditions or methods for specifying or adjusting the bit length will be described according to an exemplary embodiment. The bit length of multi-cell scheduling control information may be adjusted or determined by a combination of one or more of conditions or methods described below. Here, multi-cell scheduling control information to be transmitted in different cells may be adjusted, determined, or configured to have different bit lengths. Hereafter, adjusting, adjusting, determining, or configuring the bit length may be described with the same meaning.

- The bit length of downlink multi-cell scheduling control information and the bit length of uplink multi-cell scheduling control information may be adjusted to be the same.
  - In order to match the bit lengths of the two pieces of control information, arbitrary bit(s) may be added to control information with the smaller bit length among the two pieces of control information.
  - In order to match the bit lengths of the two pieces of control information, arbitrary bit(s) in arbitrary field(s) of control information with the larger bit length among the two pieces of control information may be deleted or not used.
- The bit length of multi-cell scheduling control information may be adjusted to be the same as the bit length of other arbitrary control information among control information for other purposes.
  - In order to match the bit length with the bit length of control information for other purposes, arbitrary bit(s) may be added to the multi-cell scheduling control information.
  - In order to match the bit length with the bit length of control information for other purposes, arbitrary bit(s) in arbitrary field(s) constituting the multi-cell scheduling control information may be deleted or not used.
- Multi-cell scheduling control information having an arbitrary bit length may be configured regardless of the length of control information for other purposes.
  - In this case, the bit length of the multi-cell scheduling control information may be configured or specified by a higher layer.
  - Here, the number of different bit lengths for the multi-cell scheduling control information and control information for other purposes may be limited to less than A for each cell.
  - Alternatively, the number of different bit lengths of other control information may be limited to less than A at least for a cell through the multi-cell scheduling control information is transmitted.
  - Here, A may be defined as 4 or greater than 4 as described in the previous exemplary embodiment. For example, A may be a maximum of 5 in a cell through which multi-cell scheduling control information is transmitted. Alternatively, A may be any other value greater than 5.
  - Alternatively, the number of different bit lengths of other control information may be limited to less than A for other cell(s) scheduled by the multi-cell scheduling control information.
  - Here, A may be defined as 4 of the previous exemplary embodiment or a value greater than 4. For example, A may be a maximum of 5 for other cells scheduled by the multi-cell scheduling control information. Alternatively, A may be any other value greater than 5.
  - Alternatively, for a cell through which multi-cell scheduling control information is transmitted or other cell(s) scheduled by the multi-cell scheduling control information, when the number of these cells is M, the number of different bit lengths of all possible control information may be limited to less than M*A.

1.1.3 Counting of Bit Length of Multi-Sell Scheduling Control Information (DCI)

Hereinafter, exemplary embodiments of a method for defining the bit length of multi-cell scheduling control information as one bit length among A bit lengths in a scheduling cell or other scheduled cells will be described. In the description below, the method will be described as ‘bit length counting’. In other words, a method in which a transmitting node and/or a receiving node counts the bit length of multi-cell scheduling control information as one of A bit lengths in each carrier or cell will be described.

If the bit lengths of control information for different purposes are the same, the bit lengths of the corresponding control information may be counted as one bit length. The bit length counting definition condition or method described below may be equally applied to at least a cell through which multi-cell scheduling control information is transmitted, applied to each cell included in multi-cell scheduling, or applied to all of cells included in multi-cell scheduling.

The bit length of multi-cell scheduling control information may be considered (counted) as one bit length only for a cell through which the multi-cell scheduling information is transmitted.

The bit length of multi-cell scheduling control information may be considered (counted) as one bit length for all cells scheduled by the multi-cell scheduling control information.

The bit length of multi-cell scheduling control information may be considered (counted) as one bit length only for one arbitrary cell among all cells scheduled by the multi-cell scheduling control information.

1.2 Configuration of Fields in Multi-Cell Scheduling Control Information

Information, information fields, or fields (hereinafter described as 'fields') that may be included in multi-cell scheduling control information may include one or more of the following.

Identifier for DCI format (e.g., uplink resource configuration control information or downlink resource configuration control information)

Carrier indicator (e.g., carrier indication information)

Indicator of co-scheduled cells (e.g., information on multiple scheduled cells)

Downlink assignment index (e.g., downlink assignment indication information)

TPC for scheduled PUCCH (e.g., PUCCH transmission power control information)

PUCCH resource indicator (e.g., PUCCH resource information)

PDSCH-to-HARQ timing indicator (e.g., reception response timing information)

Modulation and coding scheme (e.g., modulation and coding information)

New data indicator (e.g., new data information)

Redundancy version (e.g., redundancy version information)

PRB bundling size indicator (e.g., physical transport block bundle size information)

Rate matching indicator (e.g., rate matching indication information)

ZP CSI-RS trigger (e.g., information on zero power channel state information RS)

Antenna port(s) (e.g., antenna port information)

TCI (e.g., transmission configuration indication information)

SRS request (e.g., SRS request information)

DMRS sequence initialization (e.g., DMRS sequence initialization information)

Bandwidth part indicator (e.g., bandwidth part indication information)

Time domain resource assignment (e.g., time domain resource allocation information)

Frequency domain resource assignment (e.g., frequency domain resource allocation information)

VRB-to-PRB mapping (e.g., resource mapping information)

HARQ process number (e.g., HARQ process number information)

One-shot HARQ-ACK request (e.g., response request information)

ChannelAccess-CPext (e.g., unlicensed band channel access information)

Others

According to an exemplary embodiment of the present disclosure, multi-cell scheduling control information may consist of all or at least some of the fields exemplified above. Therefore, fallback DCI may be defined so as not to configure multiple carriers or multiple cells with one control information. In this case, search space(s) for monitoring multi-cell scheduling control information may be limited to a specific terminal. In other words, multi-cell scheduling control information may be monitored in a UE-specific search space (USS). As such, the base station may transmit configuration information to the terminal in advance so that the terminal that needs to receive multi-cell scheduling control information monitors USS(s).

2. Multi-Cell Scheduling

Multi-cell scheduling may include two types of scheduling.

First, multi-cell scheduling control information may include scheduling information of PDSCH(s) transmitted in downlink through multiple cells.

Second, multi-cell scheduling control information may include scheduling information of PUSCH(s) transmitted in uplink through multiple cells.

2.1 PDSCH Scheduling Information

A transmitting node (e.g., base station) may transmit multi-cell scheduling control information through a PDCCH in a multi-cell control information scheduling cell. The multi-cell scheduling control information may include scheduling information of PDSCH(s) transmitted in its own cell and/or other cell(s). In addition, the multi-cell scheduling control information may indicate a feedback timing for data transmitted through the PDSCH(s) in multiple cells, that is, HARQ transmission timing. The HARQ transmission timing may be indicated by, for example, PDSCH-to-HARQ timing indicator, and based on PDSCH-to-HARQ timing indicator, a timing of a slot in which HARQ-ACK information is transmitted may be identified. In addition, the multi-cell scheduling control information may indicate information on a PUCCH resource to transmit feedback (i.e., HARQ feedback) for the data transmitted through the PDSCH(s) in multiple cells.

These operations will be described in more detail with reference to the accompanying drawings.

Figure 12:
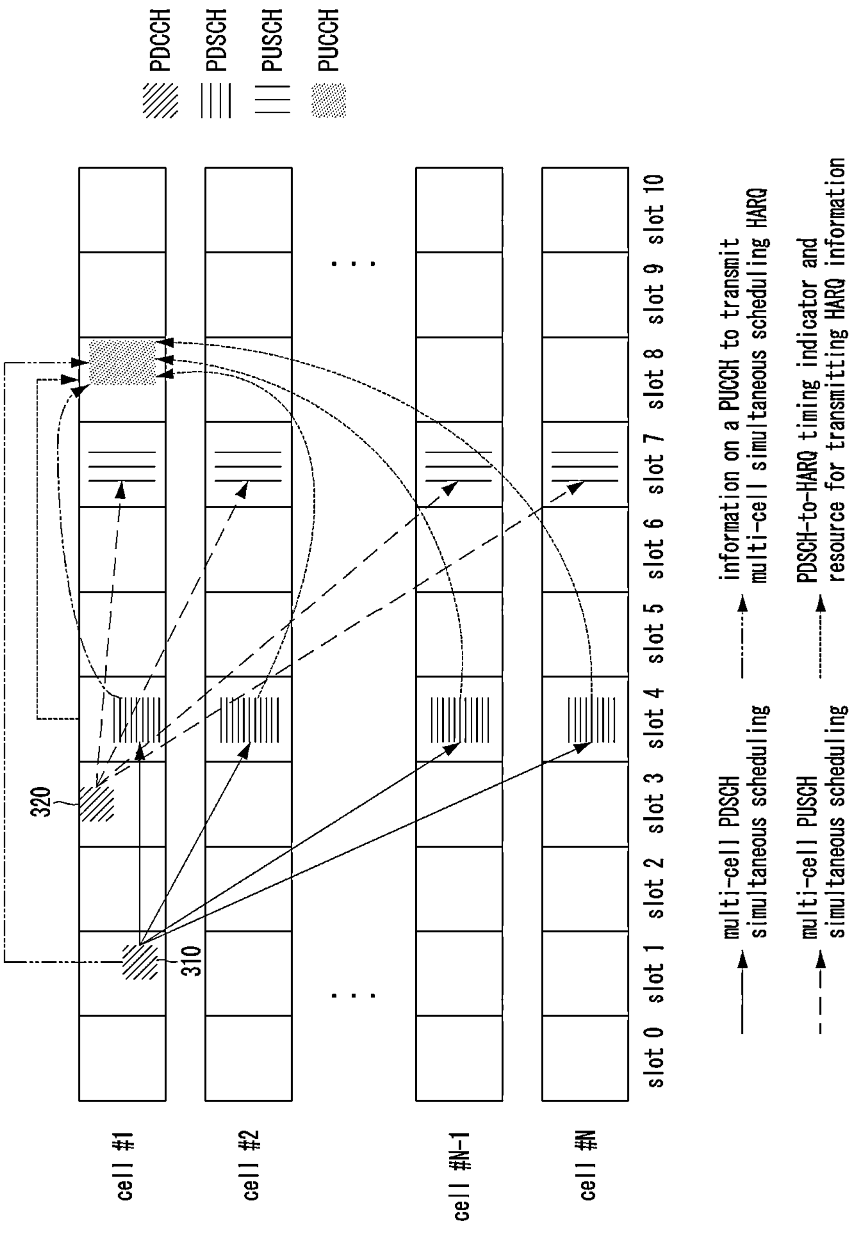
FIG. 12 is a conceptual diagram illustrating a first exemplary embodiment of multi-cell scheduling in a wireless communication network.

FIG. 12 is a conceptual diagram illustrating a first exemplary embodiment of multi-cell scheduling in a wireless communication network.

Referring to FIG. 12, a case in which N cells (e.g., cells #1 to #N) all have the same subcarrier spacing is illustrated. Since all cells have the same subcarrier spacing, the length of each slot of the cells #2 to #N may be the same as that of the cell #1. In other words, all N cells have the same slot length. In FIG. 12, 11 slots (i.e., slots 0 to 10) are illustrated in the cell #1.

In the example of FIG. 12, multi-cell scheduling control information may be transmitted in the cell #1. Therefore, the cell #1 may be a multi-cell control information scheduling cell through which multi-cell scheduling control information is transmitted, and the cells #2 to #N may be cells scheduled by the multi-cell scheduling control information. The multi-cell scheduling control information may be transmitted through a PDCCH as described above. FIG. 12 shows a PDCCH 310 transmitted in the slot 1 of the cell #1 and a PDCCH 320 transmitted in the slot 3 of the cell #1.

The multi-cell scheduling control information may be transmitted through the PDCCH 310 transmitted in the slot 1 of the cell #1. In particular, the multi-cell scheduling control information may include scheduling information for PDSCH transmission(s) in the cells #1 to #N. In other words, the multi-cell scheduling control information transmitted through the PDCCH 310 may include scheduling information of PDSCHs transmitted in the cells #1 to #N. In FIG. 12, arrows are used to visually indicate that the multi-cell scheduling control information indicates PDSCH(s) transmitted in the slot 4 of the respective cells #1 to #N.

In addition, the multi-cell scheduling control information transmitted through the PDCCH 310 may include timing information indicating a timing for transmitting feedback information corresponding to the PDSCHs transmitted in the cells #1 to #N. The timing information for feedback information transmission may be indicated by PDSCH-to-HARQ timing indicator as described above. In the exemplary embodiment of FIG. 12, a timing for transmitting a multi-cell simultaneous scheduling HARQ may be indicated as a slot after four slots from the PDSCH transmissions. Accordingly, the slot 8 of the cell #1 may be the slot for transmitting feedback information for the PDSCHs transmitted in multiple cells, which may be indicated by the multi-cell scheduling control information.

In addition, the multi-cell scheduling control information may indicate information on a PUCCH resource for transmitting the multi-cell simultaneous scheduling HARQ. Based on the indication of the multi-cell scheduling control information, the receiving node (e.g., terminal) may transmit HARQ information for the PDSCHs transmitted in multiple cells through the indicated PUCCH. In addition, in the exemplary embodiment of FIG. 12, a double dotted line arrow is used so that the timing for transmitting the multi-cell simultaneous scheduling HARQ is visually identified. Further, in the exemplary embodiment of FIG. 12, a case where the HARQ-ACK information is transmitted through the PUCCH is shown with a narrow dotted line arrow so that it is visually identified.

Hereinafter, a case in which the multi-cell scheduling control information transmitted through the PDCCH 320 schedules multiple cells will be described.

As described above, the cell #1 may be a multi-cell control information scheduling cell through which multi-cell scheduling control information is transmitted, and the cells #2 to #N may be cells scheduled by the multi-cell scheduling control information. The multi-cell scheduling control information may be transmitted through the PDCCH 320 as described above. In particular, the multi-cell scheduling control information transmitted through the PDCCH 320 transmitted in the slot 3 of the cell #1 may include information for scheduling PUSCHs transmitted in the slot #7 of the multiple cells. In the exemplary embodiment of FIG. 12, a case where the multi-cell scheduling control information schedules PUSCHs in the cells #1 to #N is illustrated with dotted arrows so that it is visually identified.

2.2 Type of Data Transmitted on PDSCH(s)

According to an exemplary embodiment of the present disclosure, data (e.g., transport block (TB)) transmitted on resources scheduled in multiple carriers or cells may be classified into three types.

The first TB type may be an independent TB for each carrier or cell.

In the second TB type, the same TB may be transmitted as being divided into scheduled resources of different carriers or different cells. In this case, when only one TB is allocated by multi-cell scheduling control information and a plurality of different carriers or cells are configured, the terminal may assume that the same TB is allocated to the plurality of different carriers or cells. Alternatively, the multi-cell scheduling control information may include indication information for indicating that the same TB is simultaneously delivered or configured in different carriers or different cells.

In the third TB type, the same TB may be repeatedly transmitted in scheduled resources of the respective carriers or cells.

In the case of the second TB type and/or the third TB type described above, the terminal may integrate data in an upper block of signal processing. In the case of the second TB type, a diversity effect may be expected by using a plurality of different radio transmission channels. In the case of the third TB type, robust transmission may be expected.

2.3 Multi-Cell Scheduling Configuration

Since multi-cell scheduling is a UE-specific technique, a search area for PDCCH monitoring may be limited to a UE-specific search space (USS). In addition, carriers or cells that may be included in multi-cell scheduling configuration may be all or part of cells included in the same PUCCH group.

Configuring the carriers or cells included in the multi-cell scheduling configuration as all or part of cell(s) included in the same PUCCH group may be to configure responses to whether or not there is a reception error for downlink transmission of each of the cell(s) using a codebook in one PUCCH. However, in multi-cell scheduling for PUCCH(s) of uplink resources, carriers or cells included in the multi-cell scheduling configuration may be configured with cells not included in the sane PUCCH group. In this case, configuration information on carriers or cells corresponding to multi-cell scheduling for PUCCH may be defined or configured by a higher layer.

In the present disclosure, a multi-cell control information scheduling cell may be one of cells included in a multi-cell scheduling group. Here, multi-cell scheduling control information may be related to downlink scheduling of multiple cells or uplink scheduling of multiple cells. Therefore, the multi-cell control information transmitted by the multi-cell control information scheduling cell may or may not include information for its own cell (i.e., multi-cell control information scheduling cell). In other words, the multi-cell control information transmitted by the multi-cell control information scheduling cell may not include information for its own cell and may include scheduling information only for other carriers or cells.

As described above, when multiple carriers or cells are configured to the terminal in the UE-specific manner, multi-cell scheduling control information may be transmitted in a carrier or cell defined as a primary cell (PCell). Here, the multi-cell scheduling control information may be transmitted in the PCell even when there is no resource scheduled to the PCell. In another exemplary embodiment, multi-cell scheduling control information may be transmitted in a secondary cell (SCell) other than the PCell. Here, transmission of multi-cell scheduling control information in the SCell may correspond to a case in which the PCell does not have a resource to be scheduled or a case in which the SCell is designated in consideration of the restriction on the number (e.g., A) of DCI bit lengths in the PCell. However, it should be defined in advance so that the terminal detects the multi-cell scheduling control information in the SCell. Accordingly, a transmitting node (e.g., base station) may designate a carrier or cell to receive multi-cell scheduling control information through a higher layer or RRC configuration/reconfiguration message. As another example, the base station may designate a carrier or cell in which the terminal monitors or detects multi-cell scheduling control information through a MAC CE defined by a higher layer or RRC configuration/reconfiguration.

2.3.1 Method of Configuring and Activating a Multi-Cell Scheduling Group

Hereinafter, a method of configuring a plurality of carriers or cells included in multi-cell scheduling control information according to the present disclosure will be described. Cells that may be included in multi-cell scheduling may be defined and described as a multi-cell scheduling group.

M cells that may be included in a multi-cell scheduling group may be configured as candidate cells by a higher layer. Some of the configured M cells may continue to be managed as candidate cells. If the number of non-candidate cells is N, the number of cells that can be scheduled by multi-cell scheduling (i.e., cells actually subjected to multi-cell scheduling) may be N. A set, bundle, or group of these N cells may be defined and described as a 'multi-cell scheduling group'.

A transmitting node (e.g., base station) may designate or configure candidate cells capable of multi-cell scheduling to a receiving node (e.g., terminal), and designate or configure cells to be included in a multi-cell scheduling group from a certain time point. As another example, the base station may directly designate or configure a multi-cell scheduling group without designating or configuring candidate cells for the terminal.

Cells included in the N cells may be configured with a higher layer (RRC) message, MAC CE, or downlink control information. Alternatively, cells included in the N cells may be configured by changing one of a higher layer (RRC) message or a signal or control information other than MAC CE. In an exemplary embodiment, any one or more cells out of the N cells may be excluded from the multi-cell scheduling group through a MAC CE. In addition, one or more other arbitrary cells may be included in the N cells through a MAC CE.

Regarding the configuration of multi-cell scheduling control information, in an exemplary embodiment, multi-cell scheduling control information fields may be classified into types according to a cell or cell group to which they are applied. Here, 'being applied' may be interpreted as having information related to a PDSCH or PUSCH configured in a corresponding cell or cell group. The multi-cell scheduling control information fields may be classified into fields that are applicable to all cells in the multi-cell scheduling group, fields that are applicable to each cell, fields that are applicable to a subgroup including some cells in the multi-cell scheduling group, or fields that belong to two or more of the above-described cases. Here, 'fields that belong to two or more of the above-described cases' may mean that, as an example, specific field(s) may be applied to all cells in the group and to individual cells.

In the present disclosure, a field that is applicable to all cells in the group may be defined as 'group-type field', a field that is applicable to a subgroup of the group may be defined as 'subgroup-type field', and a field that is applicable to an individual cell may be defined as 'cell-type field'.

As a method of notifying configuration of a 'subgroup', a transmitting node (e.g., base station) may configure an RRC message informing a configured subgroup, and transmit it to a receiving node (e.g., terminal). Alternatively, a 'subgroup' may be defined according to its physical characteristics and may be known in advance between the base station and the terminal. As an example of the physical characteristics, cells within the same band (e.g., intra-band cells) may be assumed to belong to the same subgroup. As another example of the physical characteristics, cells having the same subcarrier spacing may be assumed to belong to the same subgroup.

Among fields to be configured in the multi-cell scheduling control information, there may be a 'cell indication field' (e.g., indicator of co-scheduled cells) indicating a cell, cell group, cell subgroup, or all cells as scheduled cell(s). If the cell indication field indicates only one cell, the multi-cell scheduling control information may be used for scheduling of only one cell. Here, 'cell group' and 'cell subgroup' have been separately described, but both 'cell group' and 'cell subgroup' may be collectively referred to as 'cell group'.

A cell or cells to be scheduled by applying multi-cell scheduling control information according to the cell indication field may follow a table indicated or configured by a higher layer. In this case, the cell indication field may indicate an index of an individual cell, cell subgroup, or cell group within the table configured by a higher layer.

As another example, a cell or cells to be scheduled by applying multi-cell scheduling control information according to the cell indication field may follow a table mapped to cells activated by a MAC CE among candidate cells designated or configured by a higher layer. Here, the table mapped to cells activated by the MAC CE may be determined by the higher layer designating or configuring a first table including candidate cells and configuring a second table with the cells activated by the MAC CE among the candidate cells. Alternatively, the table mapped to cells activated by the MAC CE may be a table reconfigured with cells activated from the first table. Even in this case, the cell indication field may indicate an index of an individual cell, cell subgroup, or cell group in the table reconfigured with the activated cells.

In the above cases, PCell may be defined as a reference cell or a cell with the lowest index in the table. Thereafter, other activated cells may be mapped according to a lower order or higher order of indexes in the MAC CE. An exemplary embodiment of the table may be illustrated as shown in Table 1 below.

TABLE 1

| indicator | Scheduled cells |
|---|---|
| 0 | Cell #1 (one cell) |
| ~ | Subgroup (some cells among multiple cells) |
| N-1 | Group (all cells) |

The configuration of Table 1 (i.e., cell configuration table) may be configured through a higher layer RRC message. The configured cells may be configured in the RRC message with name(s), number(s), index(es), or expression(s) indicating the respective cells. In the present disclosure, as an index for identifying a cell, as illustrated in Table 1, indexes of different cells are described by expressing numbers after '#' such as '#1'.

In addition, in the exemplary embodiment of Table 1, an 'indicator' may correspond to a value of a control information field that may indicate a cell, cell group, subgroup, or all cells. In addition, cell(s) indicated by the indicator in Table may be defined as a single cell, a subgroup composed of some cells, or a group of all cells.

2.3.1.1 Interpretation Scheme Using Additional Information

As an exemplary embodiment of the present disclosure, the cell configuration table may include additional information for determining an interpretation scheme for an arbitrary field as well as the cell indication information. The interpretation scheme may follow what is specified in the technical specifications and/or which is indicated or configured by a higher layer. A table according to another exemplary embodiment of the present disclosure may be exemplified as shown in Table 2 below.

TABLE 2

| Indicator | Scheduled cells | Additional information |
|---|---|---|
| 0 | Cell #1 (one cell) | Value |
| ~ | Subgroup (some cells among multiple cells) | Value |
| N-1 | Group (all cells) | Value |

As illustrated in Table 2, additional information may be included and defined in the cell configuration table. As an exemplary embodiment, an arbitrary value may be configured in 'Additional Information'. In this case, a scheme of interpreting some field(s) of control information for cell(s) indicated by the corresponding indicator may be vary. Definition of value(s) of the field(s) according to the additional information may be configured by an RRC message. According to one additional information value, interpretation on one or more fields of control information may be simultaneously defined.

Tables 1 and 2 described above will be described using more specific examples. When the base station assumes that four cells are configured as a group for multi-cell scheduling, the field 'indicator' indicating cell(s) may be assumed to have a size of 3 bits. As an exemplary embodiment based on the above assumptions, as shown in Table 3 below, a mapping between cells and indicators may be defined by a higher layer.

TABLE 3

| Indicator | Scheduled cells |
|---|---|
| 0 | cell #1 |
| 1 | cell #2 |
| 2 | cell #1, cell #2 |
| 3 | cell #1, cell #3 |
| 4 | cell #1, cell #3, cell #4 |
| 5 | cell #1, cell #2, cell #3 |
| 6 | cell #1, cell #2, cell #4 |
| 7 | cell #1, cell #2, cell #3, cell #4 |

According to the exemplary embodiment of Table 3, the 'indicator' field set to 1 may indicate scheduling information for the cell #2. The 'indicator' field set to 6 may indicate multi-cell scheduling information for the cell #1, cell #2, and cell #4.

For the exemplary embodiment of Table 3, as exemplified in Table 2 above, additional information may be additionally configured. Table 4 below may be an exemplary embodiment in which additional information is additionally configured.

TABLE 4

| Indicator | Scheduled cells | Additional information |
|---|---|---|
| 0 | cell #1 | 0 |
| 1 | cell #2 | 0 |
| 2 | cell #1, cell #2 | 0 |
| 3 | cell #1, cell #3 | 1 |
| 4 | cell #1, cell #3, cell #4 | 0 |
| 5 | cell #1, cell #2, cell #3 | 0 |
| 6 | cell #1, cell #2, cell #4 | 0 |
| 7 | cell #1, cell #2, cell #3, cell #4 | 1 |

According to the exemplary embodiment of Table 4, the 'indicator' field set to 2 may indicate scheduling information for the cell #1 and cell #2. The 'indicator' field set to 7 may indicate scheduling information for the cell #1, cell #2, cell #3, and cell #4. In addition, the value of the additional information may be 0 or 1.

In an exemplary embodiment, if the additional information is set to 0, slot positions of the scheduled PDSCHs are all the same, and if the additional information is set to 1, the slot positions of the scheduled PDSCHs may follow what is defined by information configured by a higher layer or RRC message. In this case, a reference cell may be designated, K0 in the time domain resource assignment field may be interpreted as a value with respect to the designated reference cell, and an additional offset defined by a higher layer or RRC message may be considered for other cell(s), that is, cell(s) other than the reference cell. Here, K0 may represent the number of slots between the PDCCH and the PDSCH as defined in the 3GPP technical specification.

In the exemplary embodiment of Table 4, a case where the additional information is set to 1 for the 'indicator' field set to 3 or 7 and the additional information is set to 0 for the 'indicator' field set to other values is exemplified. However, this is only one exemplary embodiment, and configuration of the additional information values is not limited to Table 4.

In the case of having additional information as shown in Table 4 above, an exemplary embodiment that can be considered for cells will be described with reference to Table 5 below.

TABLE 5

| Additional information | Description [value] [cell #1/cell #2/cell #3/cell #4] | Remarks |
|---|---|---|
| 0 | 0/0/0/0 | K0 + value |
| 1 | 0/1/1/2 | K0 + value |

Table 5 may be an exemplary embodiment in an offset considered for each is defined according to the additional information value to 0 or 1. When the additional information is set to 0, 'value' in 'K0+value' may be set to 0 for all cells. In addition, when the additional information is set to 1, 'value' in 'K0+value' may be set to a different value for each cell. Specifically, a case in which the value of cell #1 is set to 0, the values of cells #2 and cell #3 are set to 1, and the value of cell #4 is set to 2 is exemplified. The type or bit size of the additional information and the corresponding offset value illustrated in Table 5 are exemplified as an exemplary embodiment, and may be changed or defined as other values.

Figure 13:
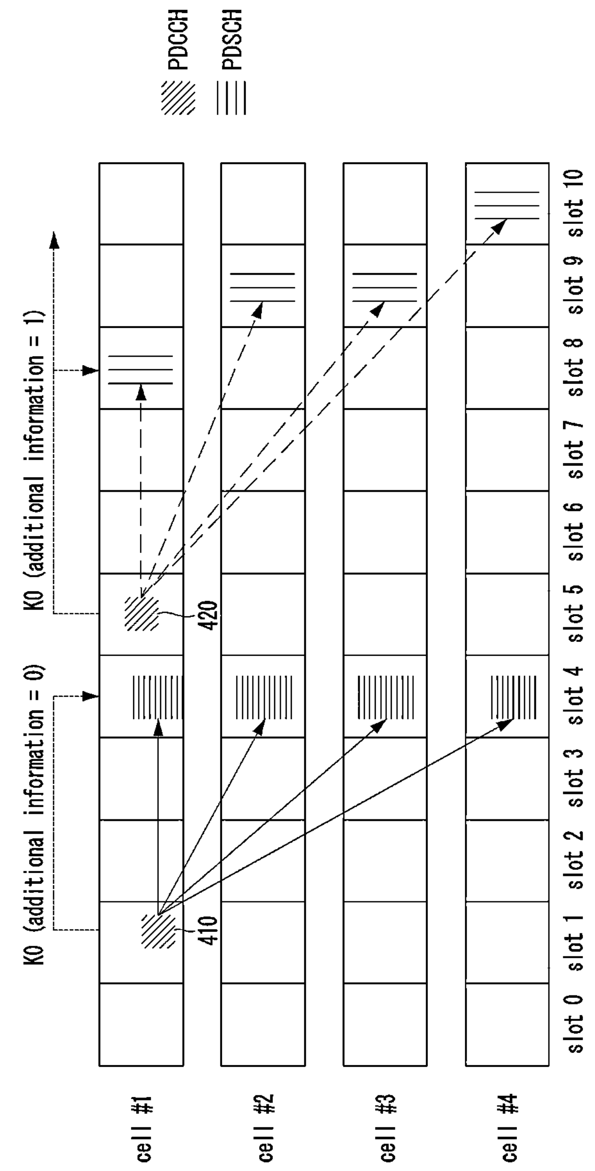
FIG. 13 is a conceptual diagram of a first exemplary embodiment for describing a multi-cell scheduling scheme in consideration of additional information.

FIG. 13 is a conceptual diagram of a first exemplary embodiment for describing a multi-cell scheduling scheme in consideration of additional information.

Referring to FIG. 13, a case in which four cells (cell #1 to cell #4) all have the same subcarrier spacing is illustrated. Since the four cells illustrated in FIG. 13 all have the same subcarrier spacing, slots of cell #1 to cell #4 are configured identically, and in FIG. 13, 11 slots (slot 0 to slot 10) for the respective cells are illustrated.

In the example of FIG. 13, multi-cell scheduling control information may be transmitted in the cell #1. In other words, the cell #1 may be a reference cell through which a PDCCH including multi-cell scheduling control information for other cells is transmitted. The transmitting node (e.g., base station) may transmit a PDCCH 410 including the multi-cell scheduling control information to the receiving node (e.g., terminal) in the slot 1 of the cell #1. In addition, the base station may transmit a PDCCH 420 including multi-cell scheduling control information to the terminal in the slot 5 of the cell #1.

First, a case in which the multi-cell scheduling control information of the PDCCH 410 transmitted in the slot 1 of the cell #1 is configured as shown in Table 5 described above and the additional information value is set to 0 will be described.

When the additional information transmitted in the slot 1 the of cell #1 set to 0, the cell #1, cell #2, cell #3, and cell #4 may be configured with a value of 'K0+0'. In other words, slots of PDSCHs transmitted in the cells #1 to #4 may be determined by K0. FIG. 13 illustrates a case where K0 indicates 3 slots. Therefore, the base station may schedule all of the cells #1 to #4 based on the multi-cell scheduling control information transmitted in the slot 1 of the cell #1. In addition, since the additional information is set to 0 and K0 indicates 3 slots, the PDSCHs may be transmitted in the slot 4 of the respective cells #1 to #4.

Referring again from the perspective of the receiving node (e.g., terminal), the terminal may receive the PDSCH in the slot 4 of each of the cells #1 to #4 based on the multi-cell scheduling control information of the PDCCH 410 received in the slot 1 of the cell #1.

In addition, a case in which the multi-cell scheduling control information of the PDCCH 420 transmitted in the slot 5 of the cell #1 is configured as shown in Table 5 described above and the additional information value is set to 1 will be described.

When the additional information transmitted in the slot 1 of the cell #1 is 1, transmission slots of the PDSCHs of the cell #1, cell #2, cell #, and cell #4 may be determined according to an interpretation scheme of the additional information. As described above, the exemplary embodiment of FIG. 13 illustrates a case where K0 indicates 3 slots. Accordingly, as illustrated in Table 5, the cell #1 may transmit the PDSCH in the slot 8 based on K0. In addition, the cell #2 and cell #3 may transmit the PDSCHs in a slot K0+1 based on the interpretation scheme of the additional information. In other words, the cell #2 and cell #3 may transmit the PDSCHs in the slot 9, which is a slot delayed by one slot from the slot K0. Since the cell #4 may be configured with a value of 'K0+2' based on the additional information interpretation scheme, the cell #4 may transmit the PDSCH in the slot 10.

The 'value' of Table 5 described above may mean a time offset for transmitting data (i.e., PDSCH). In the following description, the offset may be referred to as a data transmission time offset, time offset, slot offset, or second offset. In the present disclosure, K0 may also be referred to as a first offset. Based on the above description, the transmission time offset may have the same value or a different value.

The operation of FIG. 13 described above will be described again from the perspective of the receiving node (e.g., terminal). The terminal may interpret the multi-cell scheduling control information transmitted through the PDCCH 420 based on multi-cell scheduling control information received from the cell #1, which is the reference cell, and an offset defined by a higher layer (e.g., RRC) message received in advance. The terminal may receive PDSCHs transmitted from the respective cells based on the higher layer message and the multi-cell scheduling control information received through the PDCCH 420. For example, when the additional information included in the multi-cell scheduling control information is 1, the terminal may receive the PDSCH in the slot 8 corresponding to K0 from the cell #1, receive the PDSCHs in the slot 9 corresponding to K0+1 from the cells #2 and 3, and receive the PDSCH in the slot 10 corresponding to K0+2 from the cell #4.

Summarizing the contents described above with reference to FIG. 13 again, the PDSCH transmission time point may be configured differently for each cell based on the first offset K0 and the second offset based on the additional information and its interpretation scheme.

In addition, according to the example of FIG. 13, there may be a case where a data transmission time offset is applied and a case where a data transmission time offset is not applied, based on the additional information and its interpretation scheme. Even when the data transmission time offset is applied, two or more data transmission time offsets instead of one data transmission time offset may be determined based on one piece of the additional information.

As described above, information for interpreting the additional information, that is, for interpreting a mapping between at least one cell among the plurality of cells and the application of the data transmission time offset, may be configured by a higher layer (e.g., RRC) message.

2.3.1.2 Multi-Cell Scheduling Group Using a Bitmap

Hereinafter, another exemplary embodiment for indicating a cell or cells will be described. According to an exemplary embodiment of the present disclosure, cell(s) may be indicated using a bitmap. In the bitmap, the PCell may correspond to the lowest index bit or the highest index bit. Thereafter, other activated cells may be mapped according to the descending order or ascending order of indexes the MAC CE. As another method using a bitmap, mapping may be performed according to an order in the multi-cell scheduling group indicated or configured by a higher layer.

2.3.2 Interpretation of Control Information Based on Types for Multi-Cell Scheduling The type for multi-cell scheduling may be configured as 'group type' or 'cell type' by a higher layer. Configuration information indicating 'group type' or 'cell type' configured by a higher layer may be transmitted from a transmitting node (e.g., base station) to a terminal. Based on the configuration information indicating 'group type' or 'cell type' configured by the higher layer, two or more types of fields described below may be identified.

Fields applicable to two or more types will be described.

[Type-A] As an exemplary embodiment, a field type in which a specific field of multi-cell scheduling control information is configurable to be interpreted as 'group-type field' or 'cell-type field' may be defined as 'Type-A'. The Type-A fields may include one or more of the following fields.

- Identifier for DCI formats (e.g., uplink resource configuration control information or downlink resource configuration control information)
- Indicator of co-scheduled cells (e.g., information on multiple scheduled cells)
- Downlink assignment index (e.g., downlink assignment indication information)
- TPC for scheduled PUCCH (e.g., PUCCH transmission power control information)
- PUCCH resource indicator (e.g., PUCCH resource information)
- PDSCH-to-HARQ timing indicator (e.g., reception response timing information)

In the multi-cell scheduling control information, whether at least one of the fields indicating the control information exemplified above is a 'group-type field' or a 'cell-type field' may be identified (or interpreted).

As an exemplary embodiment of the present disclosure, contents related to PDSCH-to-HARQ timing indicator will be described. When it is defined as a 'group-type field' by a higher layer, HARQ feedback timing may be indicated as the same timing when slots of scheduled PDSCHs for all scheduled multiple cells are the same. However, when it is defined as a 'cell-type field' by a higher layer, the slots of the scheduled PDSCHs for the respective cells may be different. In this case, configuration of a reference PDSCH may be required. This is because HARQ responses to PDSCHs of all multi-scheduled cells should be delivered through a codebook-based PUCCH. In this case, the reference PDSCH may be a PDSCH scheduled at the latest time point.

Figure 14:
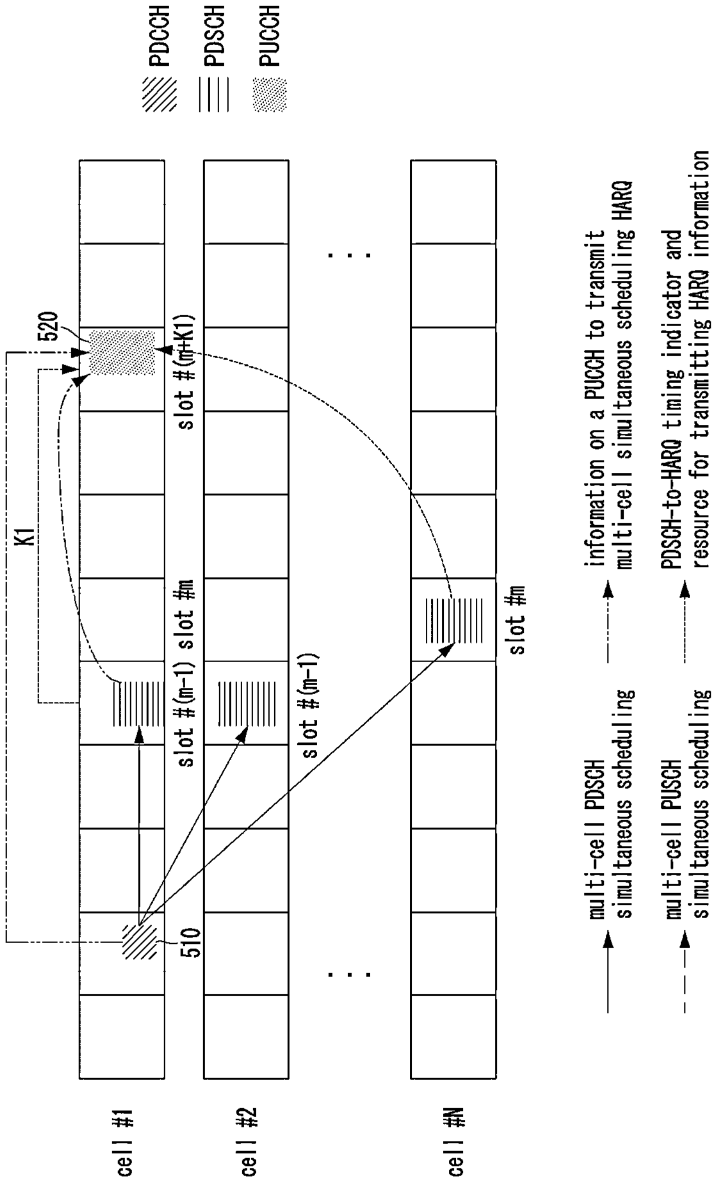
FIG. 14 is a conceptual diagram illustrating an exemplary embodiment for describing a method of determining HARQ response timings for multi-cell scheduling as different slots.

FIG. 14 is a conceptual diagram illustrating an exemplary embodiment for describing a method of determining HARQ response timings for multi-cell scheduling as different slots.

Referring to FIG. 14, a case in which N cells (i.e., cell #1 to cell #N) all have the same subcarrier spacing is exemplified. Since all cells have the same subcarrier spacing, each length of a slot in the cells #2 to #N is the same as that of the cell #1. In other words, all N cells have the same slot length.

In FIG. 14, the cell #1, as a multi-cell control information scheduling cell through which multi-cell scheduling control information according to the present disclosure is transmitted, and may become a reference cell. A transmitting node (e.g., base station) may transmit the multi-cell scheduling control information according to the present disclosure through a PDCCH 510 in the cell #1. The multi-cell scheduling control information may include scheduling information of PDSCHs for the cell #1, cell #2, . . . , and cell #N. In FIG. 14, the multi-cell PDSCH simultaneous scheduling information is illustrated with arrows so as to be visually identified.

According to the example of FIG. 14, the PDSCHs may be transmitted in a slot #(m−1) in the cells #1 and #2, and the PDSCH is transmitted in a slot #m in the cell #N. In the example of FIG. 14, a cell that transmits the PDSCH last among the cells may be the cell #N. K1 may indicate the number of slots between a PDSCH and HARQ feedback transmission as defined in the 3GPP technical specifications. The multi-cell scheduling control information transmitted through the PDCCH 510 in the cell #1 may indicate an HARQ feedback timing (i.e., a slot in which HARQ feedback is transmitted) as a value of K1. In this case, the HARQ feedback timing based on the value of K1 may be determined based on a slot in which the PDSCH is transmitted last among the cells, that is, based on the slot #m.

The multi-cell scheduling control information transmitted through the PDCCH 510 in the cell #1 may indicate an HARQ feedback resource, for example, a PUCCH resource 520. In the exemplary embodiment of FIG. 14, a case in which the PUCCH 520 resource is indicated in the cell #1, which is the reference cell, is exemplified. Accordingly, HARQ feedback information for all PDSCHs transmitted from the cells #1 to #N may be fed back through the PUCCH 520 resource indicated by the multi-cell scheduling control information in a slot #(m+K1) of the cell #1.

The feedback transmission timing will be described in more detail. The PDCCH 510 transmitted in the cell #1 may configure a PDSCH transmission timing differently for each cell. When PDSCH transmission timings are different as illustrated in FIG. 14, a reference for the PUCCH transmission timings is required. In other words, it may be needed to determine a reference slot to which K1 is applied. In the present disclosure, the case in which a transmission timing of the PUCCH is determined based on a PDSCH transmitted last (e.g., a transmission slot of the last PDSCH) among PDSCHs transmitted through downlink is exemplified. In other words, a PUCCH timing determination corresponding to PDSCHs scheduled by multi-cell scheduling control information may be based on a transmission timing of the last PDSCH among the PDSCHs scheduled by the multi-cell scheduling control information. As illustrated in FIG. 14, when transmission timings of PDSCHs are different from each other, the base station and/or the terminal may determine a transmission timing of the PUCCH 520 based on a timing of the last transmitted PDSCH. In the example of FIG. 14, a case where the PDSCH transmitted in the cell #N is the last transmission, and the PDSCH is transmitted in the slot #m is exemplified. It should be noted that a dotted line illustrated with K1 in the cell #1 means that the PUCCH is determined based on the value of K1, and does not mean that the PUCCH is spaced apart by K1 slots from the PDSCH in the cell #1.

[Type-B] As an exemplary embodiment, a field type in which a specific field of multi-cell scheduling control information is configurable to be interpreted as 'subgroup-type field' or 'cell-type field' may be defined as 'Type-B'. The Type-A fields may include one or more of the following fields.

New data indicator (e.g., new data information)

Redundancy version (e.g., redundancy version information)

In the multi-cell scheduling control information, whether at least one of the fields indicating the control information exemplified above is a 'subgroup-type field' or a 'cell-type field' may be identified (or interpreted).

The NDI field and the RV field may be configured in the order of individual cells or individual subgroups according to the cell indication field. When the cell indication field is defined with a table, they may be defined in an order of cell groups indicated or configured by a higher layer. Alternatively, they may be defined according to a descending index order or an ascending index order among activated cells of the MAC CE. Alternatively, they may be defined according to a descending index order or an ascending index order of cells activated or indicated as '1' in the bitmap. In all of the above-described cases, a scheduling cell may be defined first. For example, the PCell may be defined first in the NDI and RV fields.

[Type-C] As an exemplary embodiment, a field type in which a specific field of multi-cell scheduling control information is configurable to be interpreted as one of 'group-type field', 'subgroup-type field', and 'cell-type field' according to whether the specific field provides information on a cell, some cells, or all cells or physical characteristics of the cell(s) may be defined as 'Type-C'. The Type-C fields may include one or more of the following fields PRB bundling size indicator (e.g., physical transport block bundle size information)

Rate matching indicator (e.g., rate matching indication information)

ZP CSI-RS trigger (e.g., information on zero power channel state information RS)

Antenna port(s) (e.g., antenna port information)

TCI (e.g., transmission configuration indication information)

SRS request (e.g., SRS request information)

DMRS sequence initialization (e.g., DMRS sequence initialization information)

Bandwidth part indicator (e.g., bandwidth part indication information)

Time domain resource assignment (e.g., time domain resource allocation information)

Frequency domain resource assignment (e.g., frequency domain resource allocation information)

VRB-to-PRB mapping (e.g., resource mapping information)

HARQ process number (e.g., HARQ process number information)

One-shot HARQ-ACK request (e.g., response request information)

ChannelAccess-CPext (e.g., unlicensed band channel access information)

Here, as an exemplary embodiment, a specific field may be assumed as one of 'group-type field', 'subgroup-type field', and 'cell-type field' according to whether the specific field provides information on a cell, some cells, or all cells or according to physical characteristics of the cell(s).

2.3.3 Feedback Corresponding to Multi-Cell Scheduling

Hereinafter, a response to a transmission/reception result in multi-cell scheduling (i.e., feedback of data transmitted through PDSCHs) will be described.

As an exemplary embodiment, the terminal may configure a codebook comprising HARQ information bits by concatenating a sub-codebook for single-cell scheduling and a sub-codebook for multi-cell scheduling. In this case, a downlink assignment index (DAI) for single-cell scheduling and a DAI for multi-cell scheduling may be separately managed. In other words, a receiving node (e.g., terminal) may configure a codebook for each cell to feed back HARQ information. In this case, when multi-cell scheduling is performed, the receiving node (e.g., terminal) may concatenate codebooks for the respective cells and transmit them through one uplink channel. In order to configure one codebook as described above, a DAI for multi-cell scheduling may be managed separately from a DAI for single-cell scheduling.

In the case of multi-cell scheduling, a transmitting node (e.g., base station) may have a plurality of PDSCHs scheduled with DCI having one DAI. In this case, according to an exemplary embodiment of the present disclosure, an order for configuring the codebook may follow an order of cells within the multi-cell scheduling group configured by a higher layer. According to another exemplary embodiment of the present disclosure, the order for configuring the codebook may be in accordance with a descending order of indexes of cells activated in the MAC CE or an ascending order of the indexes of the cells activated in the MAC CE. According to another exemplary embodiment of the present disclosure, the order for configuring the codebook may be determined considering at least one of RB indexes of the PDSCHs, temporal scheduling orders of the PDSCHs, and/or slot indexed of the PDSCHs of the scheduled cells.

A situation in which a PDCCH including multi-cell scheduling control information is not received may be identified through DAI or the like. A method of configuring a codebook when the situation in which the PDCCH including multi-cell scheduling control information is not received is identified may need to be defined.

According to an exemplary embodiment of the present disclosure, a codebook for multi-cell scheduling may be configured to include HARQ information bits for all cells of the multi-cell scheduling group. In other words, the size of the codebook per multi-cell scheduling DCI may be configured as much as the maximum number of cells that can be scheduled by multi-cell scheduling.

An HARQ information bit codebook for a cell not included in the multi-cell scheduling control information as multi-cell scheduling may be defined under a specified condition. For example, it may be defined as a bit value of '0'. Alternatively, the codebook may be generated by setting the HARQ information bit to 'NACK'. Alternatively, the codebook may be generated by setting the HARQ information bit to 'DRX'

Figure 15:
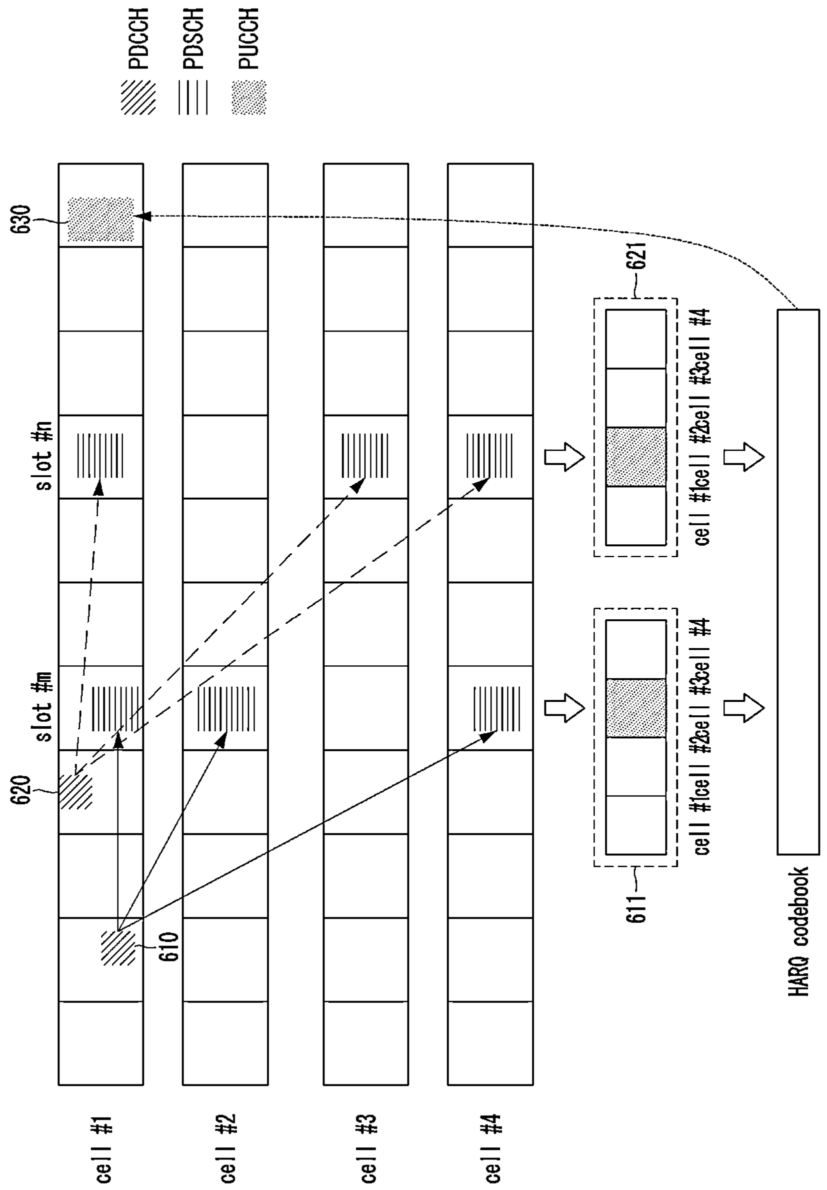
FIG. 15 is a conceptual diagram according to a first exemplary embodiment for describing configuration of a multi-cell scheduling codebook.

FIG. 15 is a conceptual diagram according to a first exemplary embodiment for describing configuration of a multi-cell scheduling codebook.

Referring to FIG. 15, a case in which four cells (i.e., cells #1 to #4) are configured as a multi-cell scheduling group, and all four cells have the same subcarrier spacing. In other words, since the four cells have the same subcarrier spacing, slots of the cells #1 to #4 may all have the same length.

In the example of FIG. 15, multi-cell scheduling control information may be transmitted in the cell #1. In other words, the cell #1 may be a reference cell through which a PDCCH including multi-cell scheduling control information for other cells is transmitted. The transmitting node (e.g., base station) may transmit a PDCCH 610 including multi-cell scheduling control information to the receiving node (e.g., terminal) in the cell #1. In addition, the base station may transmit a PDCCH 620 including multi-cell scheduling control information to the terminal in the cell #1.

The multi-cell scheduling control information transmitted through the PDCCH 610 may include scheduling information of PDSCHs transmitted in a slot #m of the cells #1, #2, and #4. In addition, the multi-cell scheduling control information transmitted through the PDCCH 620 may include scheduling information of PDSCHs transmitted in a slot #n of the cells #1, #3, and #4.

HARQ-ACK information of each cell among the cells #1 to #4 scheduled by the PDCCH 610 may be configured as a per-cell codebook. In addition, one codebook 611 may be generated by concatenating the per-cell codebooks.

In addition, HARQ-ACK information of each cell among the cells #1 to #4 scheduled by the PDCCH 620 may also be configured as a per-cell codebook. In addition, one codebook 621 may be generated by concatenating the per-cell codebooks.

In this case, in the case that a PDSCH is not scheduled in at least one of the four cells as described above, when configuring the codebook, the size of the codebook may be determined by considering the maximum number (i.e., 4) of cells that can be scheduled, including unscheduled cells.

When configuring a codebook for the cell #3 that is not scheduled by the multi-cell scheduling control information transmitted through the PDCCH 610, an HARQ-ACK bit corresponding thereto may be set to '0' or 'negative acknowledgement (NACK)'. In FIG. 15, a portion where the HARQ-ACK information corresponding to the unscheduled cell #3 is inserted is exemplified by hatching so that it can be identified.

In addition, when configuring a codebook for the cell #2 that is not scheduled by the multi-cell scheduling control information transmitted through the PDCCH 620, an HARQ-ACK bit corresponding thereto may be set to '0' or NACK. In FIG. 15, a portion where the HARQ-ACK information corresponding to the unscheduled cell #2 is inserted is exemplified by hatching so that it can be identified.

In the exemplary embodiment of FIG. 15, the HARQ feedbacks for cells scheduled by the PDCCH 610 and the HARQ feedbacks for cells scheduled by the PDCCH 620 may be concatenated into one HARQ codebook. That is, according to an exemplary embodiment of the present disclosure, HARQ feedback information based on the multi-cell scheduling control information transmitted through the PDCCHs 610 and 620 is configured as one codebook, and transmitted through a PUCCH 630 allocated to the cell #1.

3. Transmitting Node and Receiving Node Operation for Multi-Cell Scheduling

Based on the methods described above, an exemplary embodiment in which multi-cell scheduling control information is configured between the transmitting node and the receiving node (e.g., base station and terminal), and data and a response signal thereto are transmitted according to the multi-cell scheduling control information will be described.

Figure 16:
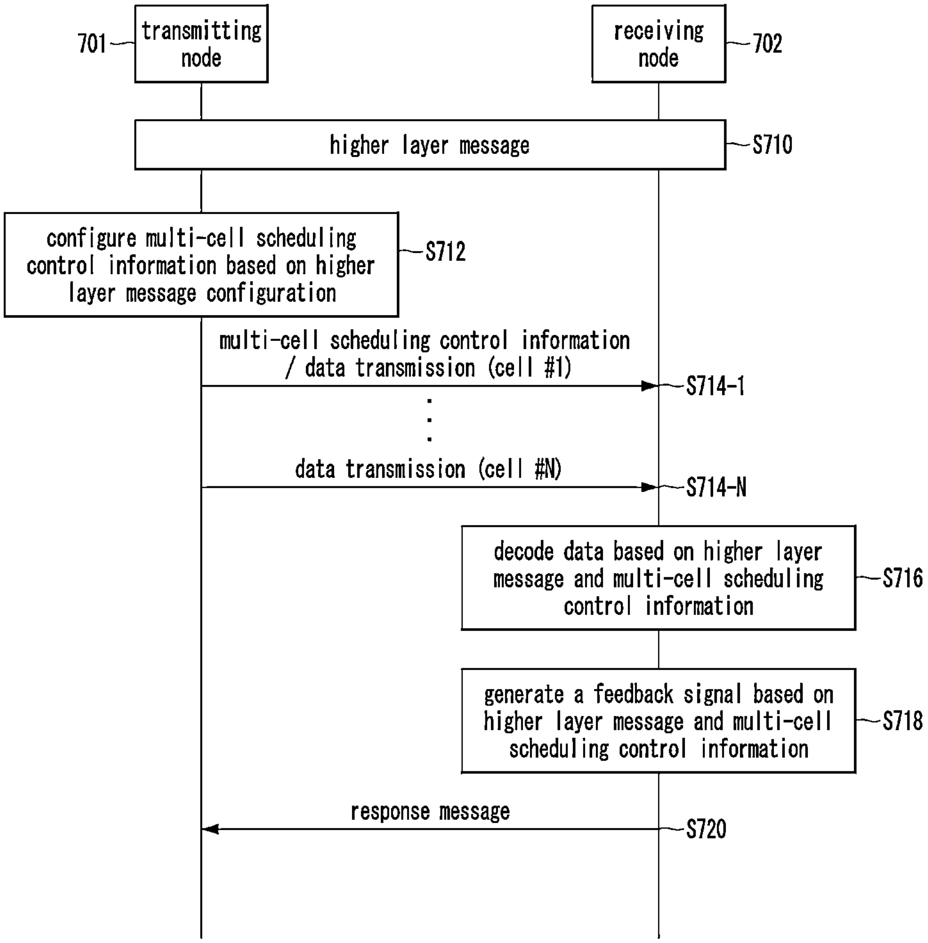
FIG. 16 is a signal flow diagram illustrating scheduled data and response signal transmission between a transmitting node and a receiving node based on a multi-cell scheduling scheme.

FIG. 16 is a signal flow diagram illustrating scheduled data and response signal transmission between a transmitting node and a receiving node based on a multi-cell scheduling scheme.

Referring to FIG. 16, a transmitting node 701 may be a node to transmit data, for example, a base station. Also, a receiving node 702 may be a node receiving data, for example, a terminal (e.g., UE).

The transmitting node 701 may transmit a higher layer message to the receiving node 702 (S710). CORESET information and search space information may be configured in the higher layer message. The higher layer message may include at least one of information described below in addition to the CORESET information and the search space information.

According to an exemplary embodiment of the present disclosure, the transmitting node 701 may transmit a table including an indicator indicating each cell, group, and/or subgroup of cells capable of multi-cell scheduling using a higher layer message. In the following description, the table will be referred to as a 'multi-cell scheduling table'.

According to an exemplary embodiment of the present disclosure, the transmitting node 701 may transmit the multi-cell scheduling table by including additional information in the multi-cell scheduling table. If the table includes the additional information, a higher layer message for interpreting the multi-cell scheduling control information based on the additional information may be transmitted to the receiving node 702. The higher layer message transmitted from the transmitting node 701 to the receiving node 702 may be, for example, an RRC message and/or MAC CE.

According to an exemplary embodiment of the present disclosure, information for configuring the multi-cell scheduling control information (e.g., DCI bit length and/or the number of DCI bit lengths) may be configured in the higher layer message.

According to an exemplary embodiment of the present disclosure, information indicating a carrier or cell to receive the multi-cell scheduling control information may be configured in the higher layer message.

According to an exemplary embodiment of the present disclosure, the number of candidate cells that may be included in a multi-cell scheduling group and the candidate cells may be configured in the higher layer message.

According to an exemplary embodiment of the present disclosure, type information for multi-cell scheduling may be configured in the higher layer message. The type information for multi-cell scheduling may be information indicating at least one or two or more of 'group-type', 'cell-type', and 'subgroup-type'.

According to an exemplary embodiment of the present disclosure, an order for configuring codebook may be configured in the higher layer message. For example, it may be information for determining indexes of cells for configuring a codebook or an order of the indexes of cells.

The transmitting node 701 may configure multi-cell scheduling control information for data transmission based on the higher layer configuration (S712). The multi-cell scheduling control information may be transmitted through, for example, a PDCCH. In addition, the multi-cell scheduling control information may be transmitted through a multi-cell control information scheduling cell, that is, a reference cell.

The multi-cell scheduling control information may include at least some of the fields described in Section 1.2, and its bit length may be determined as described in Section 1.1.2. In addition, as described in Section 2, the multi-cell scheduling control information may configured as control information for downlink data scheduling and/or uplink data scheduling. The multi-cell scheduling control information may be configured in the terminal-specific (UE-specific) manner.

The receiving node 702 may receive the multi-cell scheduling control information based on the higher layer configuration (S712).

The receiving node 702 may receive data based on the received higher layer message and/or multi-cell scheduling control information (S714-1 to S714-N). In this case, the data may be received through multiple cells. For example, the receiving node 702 may receive PDSCHs in the cell through which the PDCCH including the multi-cell scheduling control information is received and/or other cell(s). In FIG. 16, although the steps S714-1 and S714-N are exemplified as if data are sequentially transmitted, they may be simultaneously transmitted in the respective cells. For example, as illustrated in FIG. 12, data, that is, PDSCHs, may be transmitted in the same slot (e.g., slot 4) of a plurality of cells (cells #1 to #N) based on the PDCCH 310. As another example, based on the PDCCH 420 of FIG. 13, data may be transmitted in the same slot (e.g., slot 9) of some cells (cells #2 and #3) of a plurality of cells (e.g., cells #1 to #4), and data may be transmitted in different slots (e.g., slots 8 and 10) of other cells (e.g., cells #1 and #4) of the plurality of cells (e.g., cells #1 to #4). Therefore, in the steps S714-1 to S714-N of FIG. 16, the PDSCHs including data may be transmitted sequentially and/or simultaneously. However, the multi-cell scheduling control information may be transmitted prior to the data.

The receiving node 702 may decode the data received in the steps S714-1 to S714-N based on the higher layer message received in the step S710 and the multi-cell scheduling control information received in the step S714-1 (S716).

The receiving node 702 may generate a feedback signal to be transmitted to the transmitting node 601 according to a decoded result based on the higher layer message and the multi-cell scheduling control information. As a method of generating the feedback signal, the feedback configuration method and transmission method described in Section 2.3.3 may be used.

The receiving node 702 may transmit a response message including the generated feedback signal to the transmitting node 701 (S720). At least a part of the contents described in Section 2.3.3 and the contents described through the exemplary embodiment of FIG. 15 may be applied to the response message.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a base station, the method comprising:

transmitting, to a terminal, a higher layer message including a first table and a second field, wherein the first table includes combinations of co-scheduled cells, and the second field is configured to include a plurality of values for a physical resource block (PRB) bundling size;

transmitting, to the terminal, downlink control information (DCI) including a first indicator indicating a combination of co-scheduled cells in the first table, and a PRB bundling size indicator;

transmitting, to the terminal, data through the co-scheduled cells indicated by the first indicator and a PRB size indicated by the PRB bundling size indicator; and receiving, from the terminal, a response message for the data transmitted through the co-scheduled cells based on the DCI, wherein the PRB bundling size indicator indicates one of the plurality of values, and a PRB bundling size corresponding to the one of the plurality of values indicated by the PRB bundling size indicator is applied to each of the co-scheduled cells based on the second field.

2. The method according to claim 1, wherein the higher layer message further includes at least one of a third field configured with a second table, or a fourth field configured with a third table, and wherein the second table includes entries associated with joint rate matching for cells, and the third table includes entries associated with a zero power channel state information-reference signal (ZP CSI-RS) trigger.

3. The method according to claim 2, wherein the DCI further includes a rate matching indicator indicating an entry in the second table.

4. The method according to claim 2, wherein the DCI further includes ZP CSI-RS trigger indicating an entry in the third table.

5. The method according to claim 1, wherein the higher layer message further includes a sixth field configured with a fourth table, the fourth table including entries associated with joint time domain resource allocations (TDRA).

6. The method according to claim 5, wherein the DCI further includes a second indicator indicating an entry in the fourth table.

7. The method according to claim 1, wherein the DCI and the response message are transmitted via a reference cell among the combination of co-scheduled cells indicated by the first indicator, and wherein the response message includes codebooks consisting of HARQ information corresponding to each co-scheduled cells.

8. A method of a terminal, the method comprising:

receiving, from a base station, a higher layer message including a first table and second field, wherein the first table includes combinations of co-scheduled cells, and the second field is configured to include a plurality of values for a PRB bundling size;

receiving, from the base station, downlink control information (DCI) including a first indicator indicating a combination of co-scheduled cells in the first table, and a PRB bundling size indicator;

receiving, from the base station, data through the co-scheduled cells indicated by the first indicator and a PRB size indicated by the PRB bundling size indicator; and transmitting, to the base station, a response message for the data transmitted through the co-scheduled cells based on the DCI, wherein the PRB bundling size indicator indicates one of the plurality of values, and a PRB bundling size corresponding to the one of the plurality of values indicated by the PRB bundling size indicator is applied to each of the co-scheduled cells based on the second field.

9. The method according to claim 8, wherein the higher layer message further includes at least one of a third field configured with a second table, or a fourth field configured with a third table, and wherein the second table includes entries associated with joint rate matching for cells, and the third table includes entries associated with a zero power channel state information-reference signal (ZP CSI-RS) trigger.

10. The method according to claim 9, wherein the DCI further includes a rate matching indicator indicating an entry in the second table.

11. The method according to claim 9, wherein the DCI further includes ZP CSI-RS trigger indicating an entry in the third table.

12. The method according to claim 8, wherein the higher layer message further includes a sixth field configured with a fourth table, the fourth table including entries associated with joint time domain resource allocations (TDRA).

13. The method according to claim 12, wherein the DCI further includes a second indicator indicating an entry in the fourth table.

14. The method according to claim 8, wherein the DCI and the response message are transmitted via a reference cell among the combination of co-scheduled cells indicated by the first indicator, and wherein the response message includes codebooks consisting of HARQ information corresponding to each co-scheduled cell.

15. A terminal, comprising:

at least one processor, wherein the at least one processor is configured to cause the terminal to:

receive, from a base station, a higher layer message including a first table and second field, wherein the first table includes combinations of co-scheduled cells, and the second field is configured to include a plurality of values for a PRB bundling size;

receive, from the base station, downlink control information (DCI) including a first indicator indicating a combination of co-scheduled cells in the first table, and PRB bundling size indicator;

receive, from the base station, data through the co-scheduled cells indicated by the first indicator and a PRB size indicated by the PRB bundling size indicator; and transmit, to the base station, a response message for the data transmitted through the co-scheduled cells based on the DCI, wherein the PRB bundling size indicator indicates one of the plurality of values, and a PRB bundling size corresponding to the one of the plurality of values indicated by the PRB bundling size indicator is applied to each of the co-scheduled cells based on the second field.

* * * * *